(12) United States Patent
Youn et al.

(10) Patent No.: US 8,547,921 B2
(45) Date of Patent: Oct. 1, 2013

(54) METHOD OF TRANSMITTING PREAMBLE FOR SUPPORTING RELAY SYSTEM

(75) Inventors: Ae Ran Youn, Anyang-si (KR); Jin Sam Kwak, Anyang-si (KR); Kyu Jin Park, Anyang-si (KR); Ji Wook Chung, Anyang-si (KR)

(73) Assignee: LG Electronics Inc., Seoul (KR)

( * ) Notice: Subject to any disclaimer, the term of this patent is extended or adjusted under 35 U.S.C. 154(b) by 114 days.

(21) Appl. No.: 13/141,932

(22) PCT Filed: Dec. 3, 2009

(86) PCT No.: PCT/KR2009/007198
§ 371 (c)(1),
(2), (4) Date: Jul. 15, 2011

(87) PCT Pub. No.: WO2010/074421
PCT Pub. Date: Jul. 1, 2010

(65) Prior Publication Data
US 2011/0261749 A1    Oct. 27, 2011

(30) Foreign Application Priority Data
Dec. 23, 2008 (KR) .......................... 10-2008-0132140

(51) Int. Cl.
*H04W 4/00* (2009.01)

(52) U.S. Cl.
USPC ............................................. 370/329; 370/328

(58) Field of Classification Search
USPC ................... 370/310, 315, 328, 329, 330, 331
See application file for complete search history.

(56) References Cited

U.S. PATENT DOCUMENTS

| 2007/0087691 | A1 | 4/2007 | Lee et al. |
| 2007/0217353 | A1 | 9/2007 | Asa et al. |
| 2008/0159217 | A1 | 7/2008 | Chang et al. |
| 2008/0212512 | A1 | 9/2008 | Harpek et al. |
| 2008/0225789 | A1* | 9/2008 | Kim et al. ..................... 370/329 |
| 2009/0097434 | A1* | 4/2009 | Leng et al. ..................... 370/315 |
| 2009/0203309 | A1* | 8/2009 | Okuda ............................. 455/7 |

* cited by examiner

*Primary Examiner* — Michael Thier
*Assistant Examiner* — Feben M Haile
(74) *Attorney, Agent, or Firm* — McKenna, Long & Aldridge, LLP

(57) ABSTRACT

The present invention relates to a frame structure and method for supporting a relay. According to an embodiment of the present invention, a method for transmitting a preamble from a network supporting a relay includes transmitting a first preamble for establishing synchronization with at least one of a mobile station and a relay station, and transmitting a second preamble including supplemental information for accurately establishing synchronization with at least one of the mobile station and the relay station.

17 Claims, 18 Drawing Sheets

METHOD OF TRANSMITTING PREAMBLE FOR SUPPORTING RELAY SYSTEM

This application is a 35 U.S.C. §371 National Stage entry of International Application No. PCT/KR2009/007198, filed on Dec. 3, 2009, and claims priority to Korean Application No. 10-2008-0132140, filed Dec. 23, 2008, which is hereby incorporated by reference in its entirety as if fully set forth herein.

TECHNICAL FIELD

The present invention relates to a wireless access system. Also, the present invention relates to a frame structure and method for supporting a relay.

BACKGROUND ART

Hereinafter, a general frame structure being used in a wireless access system will be described.

FIG. 1 illustrates a frame structure being used in a broadband wireless access system (e.g., IEEE 802.16).

Referring to FIG. 1, a horizontal axis of the frame indicates an Orthogonal Frequency Division Multiple Access (OFDMA) symbol in time units, and a vertical axis of the frame indicates logical numbers of a sub-channel in frequency units. In FIG. 1, one frame is divided into data sequence channels during a predetermined time cycle period based upon the physical characteristics of the frame. More specifically, one frame consists of one DownLink Subframe and one UpLink Subframe.

At this point, the DownLink Subframe may include a preamble, a Frame Control Header (FCH), a DownLink map (DL-MAP), an UpLink map (UL-MAP, and at least one or more data bursts. Furthermore, the UpLink Subframe may consist of at least one or more UpLink data bursts and ranging sub-channels.

As shown in FIG. 1, the preamble, which corresponds to a specific set of sequence data positioned in the first symbol of each frame, is used to synchronize a terminal with a base station or to estimate a channel. The FCH is used to provide channel allocation information associated with the DL-MAP and information on channel codes. The DL-MAP/UL-MAP respectively corresponds to a Medium Access Control (MAC) message that is used to notify channel source allocation to the terminal. Furthermore, the data burst indicates a unit of the data being transmitted to the terminal from the base station or to the base station from the terminal.

A Downlink Channel Descriptor (DCD) that may be used in FIG. 1 represents an MAC message for notifying the physical characteristic in the DownLink channel, and an UpLink Channel Descriptor (UCD) that may be used in FIG. 1 represents an MAC message for notifying the physical characteristic in the UpLink channel.

Referring to FIG. 1, in case of the DownLink, the terminal detects the preamble being transmitted from the base station, so as to establish the synchronization with the base station. Thereafter, the UpLink map may be decoded by using the information acquired from the Frame Control Header (FCH). The base station may use a DownLink map or an UpLink map (DL-MAP/UL-MAP), so as to transmit scheduling information for Downlink or Uplink source allocation information to the terminal for each frame (e.g., 5 ms).

DISCLOSURE OF INVENTION

Technical Problem

An object of the present invention devised to solve the problem lies on providing an efficient communication system and communication method.

Another object of the present invention devised to solve the problem lies on providing a frame structure for supporting a multi-hop relay.

A further object of the present invention devised to solve the problem lies on providing an allocation method of a synchronization channel and an allocation method of a broadcast channel in a communication system for supporting a relay.

The technical objects that are to be realized and attained by the present invention are not limited only to the technical objects pointed out in the description set forth herein. Other technical objects that have not been pointed out herein will become apparent to those having ordinary skill in the art upon examination of the following or may be learned from the written description and claims hereof as well as the appended drawings.

Technical Solution

In order to achieve the object of the present invention, a frame structure and method for supporting a relay is disclosed herein.

According to an aspect of the present invention, a method for transmitting a preamble from a network supporting a relay includes transmitting a first preamble for establishing synchronization with at least one of a mobile station and a relay station, and transmitting a second preamble including supplemental information for accurately establishing synchronization with at least one of the mobile station and the relay station.

In the aspect of the present invention, it is preferable that the second preamble is periodically transmitted with a predetermined time interval after the transmission of the first preamble.

In the aspect of the present invention, the first preamble and the second preamble may include at least one of a synchronization channel and a broadcast channel. At this point, the relay station may be divided into an odd-hop relay station and an even-hop relay station based upon a number of hops with a base station. Herein, the first preamble may be transmitted from a downlink access zone, and the second preamble may be transmitted from a downlink relay zone. At this point, the odd-hop relay station and the even-hop relay station may transmit a third preamble to the terminal or a subordinate relay station, wherein the third preamble is used to establish synchronization with the odd-hop relay station and the even-hop relay station at a same time point where the first preamble is being transmitted.

In the aspect of the present invention, the odd-hop relay station and the even-hop relay station may transmit a third preamble from each downlink transmit zone to the terminal or a subordinate relay station, the third preamble being used to establish synchronization with the odd-hop relay station and the even-hop relay station. At this point, the third preamble may be transmitted after a predetermined offset value from a time point where the first preamble is being transmitted.

According to another aspect of the present invention, a method for transmitting a preamble from a network supporting a relay includes transmitting a first preamble from a first relay station in a downlink to a second relay station or mobile station for establishing synchronization with the first relay station, wherein the first preamble may include hop information on the first relay station.

In the other aspect of the present invention, the hop information may indicate whether the first relay station corresponds to an odd hop or an even hop.

In the other aspect of the present invention, the first preamble may be transmitted at the same time point as a preamble being transmitted from a base station and a preamble transmitted from the second relay station. And, at this point, a frame structure used in the first relay station may be configured of a downlink transmit zone and a downlink receive zone.

In the other aspect of the present invention, the first preamble may be transmitted to the second relay station or the mobile station from a downlink access zone of the downlink. Herein, it is preferable that the downlink is configured in an order of a downlink transmit zone, a gap, and a downlink receive zone.

In the other aspect of the present invention, the first preamble may be transmitted only to the mobile station from a downlink access zone of the downlink. And, herein, the first relay station may further include a step of transmitting a second preamble to the mobile station or the second relay station from a downlink transmit zone for accurately establishing synchronization with the first relay station. At this point, the downlink may be configured in an order of the downlink access zone, a first gap, a downlink receive zone, a second gap, and the downlink transmit zone.

In the other aspect of the present invention, the first preamble may be included in a super frame header and transmitted, and the second preamble may be transmitted with a predetermined cycle period after the transmission of the first preamble. Herein, the downlink may be configured in an order of the downlink access zone, the downlink transmit zone, a gap, and a downlink receive zone.

In the other aspect of the present invention, the first preamble may be transmitted only to the mobile station from a downlink access zone of the downlink, and the downlink may be configured in an order of the downlink access zone, a gap, and a bi-directional receive zone.

In the other aspect of the present invention, the first preamble may be transmitted only to the mobile station from a downlink access zone of the downlink, and wherein the downlink is configured of the downlink access zone, a first gap, and a second gap. Herein, the first relay station may further include a step of transmitting a second preamble to the mobile station or the second relay station from a bi-directional receive zone for accurately establishing synchronization with the first relay station.

In the other aspect of the present invention, the first preamble and the second preamble may be transmitted from neighboring positions. Also, the first preamble and the second preamble may be spaced apart at a predetermined distance and transmitted.

According to a further aspect of the present invention, a mobile station that can perform data exchange with a base station or relay station in a network supporting a relay, includes a processor; a receiving module; a transmitting module; and an antenna transmitting a wireless signal received from an outside environment to the receiving module and transmitting a wireless signal delivered from the transmission module to the outside environment. Herein, the receiving module may perform demodulation and decoding on a wireless signal being delivered from the antenna. The transmitting module may perform modulation and encoding on data being delivered from the processor. And, the processor may control the receiving module so that a first preamble for establishing synchronization with the transmitting end is received from a relay station from a downlink access zone of the relay station, and uses the first preamble to acquire synchronization with the relay station.

In the further aspect of the present invention, the relay station may be divided into an odd-hop relay station and an even-hop relay station based upon a number of hops with a base station.

In the further aspect of the present invention, the first preamble may further include hop information, wherein the hop information indicates whether the relay station corresponds to an odd hop or an even hop, and wherein the controller uses the hop information to determine a type of the relay station and uses a frame structure corresponding to the determined relay station type, thereby controlling the transmitting module so that data can be transmitted to the relay station.

In the further aspect of the present invention, the controller may control the receiving module so that a second preamble for acquiring accurate synchronization with the relay station from a downlink transmit zone of the relay station can be further received.

Advantageous Effects

According to the embodiments of the present invention, the present invention has the following advantages.

Firstly, by using the embodiments of the present invention, efficient communication may be performed.

Secondly, by proposing a frame structure used in a relay station (or satellite station) supporting a multi-hop relay, a mobile terminal and lower RS within the relay station may efficiently receive synchronization and system information from a base station or upper RS.

Thirdly, by using an allocation method of a synchronization channel and an allocation method of a broadcast channel disclosed in the embodiments of the present invention, the terminal and/or lower RS may efficiently acquire synchronization with the base station or upper RS.

The advantages of the invention are not limited only to the advantages pointed out in the description set forth herein, and other advantages may be realized and attained by the structure particularly pointed out in the written description and claims hereof as well as the appended drawings.

MODE FOR THE INVENTION

Figure 1:
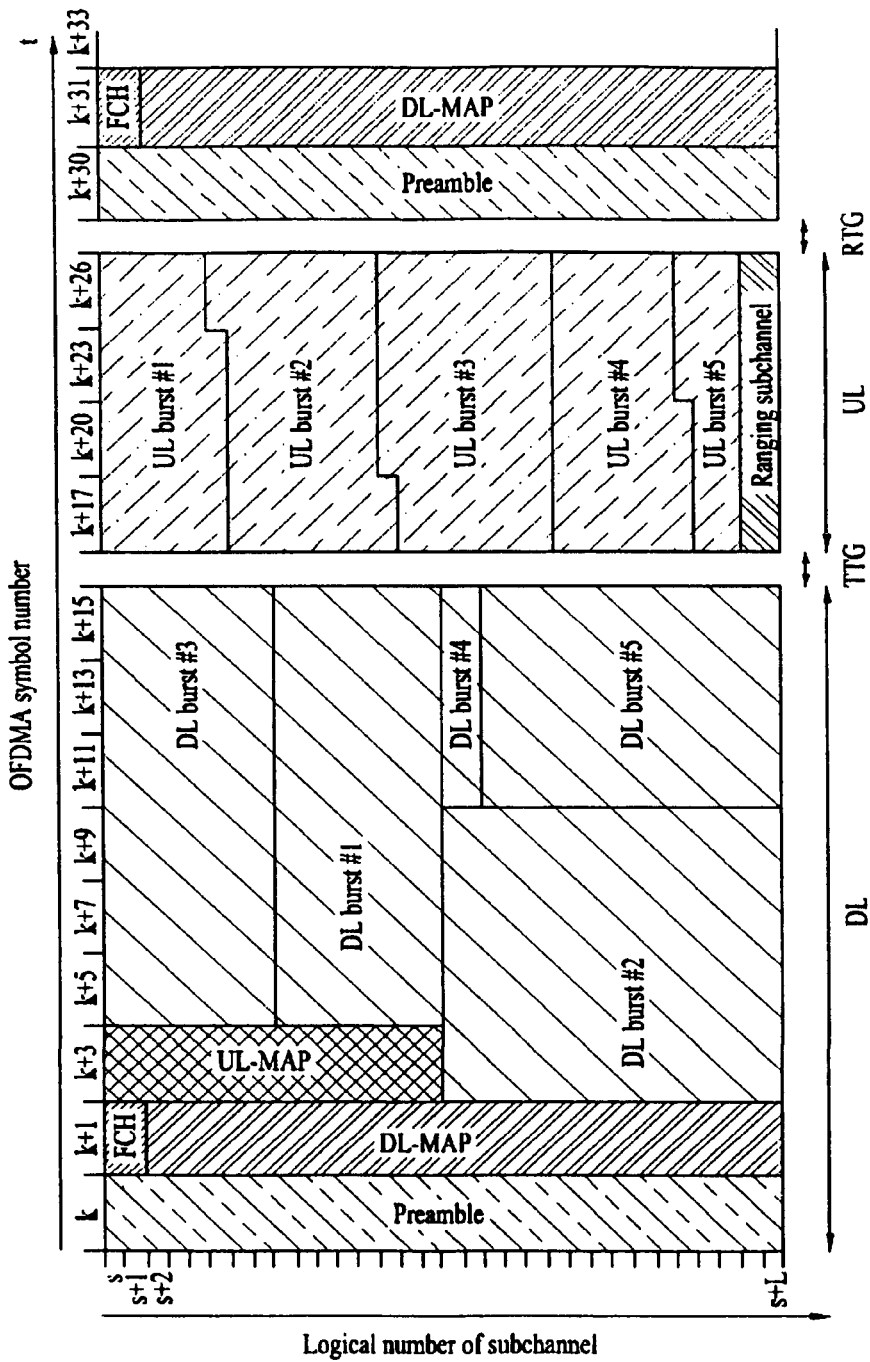
FIG. 1 illustrates a frame structure being used in a broadband wireless access system (e.g., IEEE 802.16).

The present invention relates to a wireless access system. Also, the present invention relates to a frame structure and method for supporting a relay.

The embodiments of the present invention described below correspond to a predetermined form of assembly of the elements and characteristics of the present invention. If not mentioned otherwise, each element or characteristic of the present invention may be selectively considered. Also, each element or characteristic of the present invention may also be embodied without being assembled or combined with other elements or characteristics of the present invention. Furthermore, the embodiments of the present invention may be configured by assembling or combining part of the elements and/or characteristics of the present invention. The order of the operations described in the embodiments of the present invention may be altered. And, some of the elements or characteristics of any one embodiment of the present invention may be included in any other embodiment, or may replace the respective element or characteristic of the other embodiment of the present invention.

In the brief description of the drawings, any process or step that may deviate from the spirit or scope of the present invention will not be described herein. Furthermore, any process or step that may be understood by those skilled in the art has been omitted from the description set forth herein.

The specification of the present invention mainly describes the data-transmission and data-reception relation between a base station and a terminal. Herein, the base station has its significance as a terminal node of a network directly performing communication with the terminal. In the description of the present invention, specific operations described to be performed by the base station may also be, in some occasion, performed by an upper node of the base station.

More specifically, in a network configured of multiple network nodes, a variety of operations performed in the network in order to communicate with the terminal may be performed by the base station or by other network nodes that do not belong to the base station. At this point, the term 'base station' may also be replaced with other terms, such as a fixed station, Node B, eNode B (eNB), access point, and so on. Furthermore, the term 'mobile station (MS)' may be replaced with other terms, such as UE (User Equipment), SS (Subscriber Station), MSS (Mobile Subscriber Station), or mobile terminal.

Additionally, a transmitting end represents a node for transmitting data or voice (or audio) services, and a receiving end represents a node for receiving data or voice (or audio) services. Therefore, in an uplink, the terminal may become the transmitting end, and the base station may become the receiving end. Similarly, in a downlink, the terminal may become the receiving end, and the base station may become the transmitting end.

Meanwhile, a PDA (Personal Digital Assistant), a cellular phone, a PCS (Personal Communication Service) phone, a GSM (Global System for Mobile) phone, a WCDMA (Wideband CDMA) phone, an MBS (Mobile Broadband System) phone, and so on, may be used as the mobile terminal of the present invention.

The embodiments of the present invention may be realized by a variety of means. For example, the embodiments of the present invention may be realized as hardware, firmware, or software, or in a combined form of two or more of hardware, firmware, and software.

When configuring the embodiment of the present invention in the form of hardware, a method according to the embodiments of the present invention may be realized by using one or more of ASICs (application specific integrated circuits), DSPs (digital signal processors), DSPDs (digital signal processing devices), PLDs (programmable logic devices), FPGAs (field programmable gate arrays), a processor, a controller, a micro-processor, a micro-controller, and so on.

When configuring the embodiment of the present invention in the form of firmware or software, a method according to the embodiments of the present invention may be realized in the form of a module, procedure, or mathematical function performing the functions or operations described in the specification of the present invention. A software code may be stored in a memory unit so as to be configured by a processor. The memory unit may be placed inside or outside of the processor, thereby being capable of sending and receiving data with the processor through a variety of previously disclosed means.

The embodiments of the present invention may be supported by standard documents disclosed in at least one of the wireless access systems, the 802 system, the 3GPP system, the 3GPP LTE system, and the 3GPP2 system. More specifically, among the embodiments of the present invention, steps or part of the present invention that have not been described in order to clearly disclose the technical scope and spirit of the present invention, may be supported by the above-mentioned documents. All terms disclosed in the description of the present invention may be described by the above-mentioned documents. Particularly, the embodiments of the present invention may be supported by at least one or more standard documents of the IEEE 802.16 system, such as document P802.16-2004, document P802.16e-2005, and document P802.16Rev2.

The specific terms used in the description of the present invention are merely provided to help and facilitate the understanding of the present invention. The usage of such term may vary within the technical scope and spirit of the present invention.

For example, terms such as Subordinate Relay Station and Superordinate Relay Station are used in the embodiment of the present invention. Herein, the Subordinate Relay Station and the Superordinate Relay Station are co-relative terms. Based on the base station (BS), a first RS (i.e., an Odd-Hop RS) corresponds to a superordinate relay station of a second RS (i.e., an Even-Hop RS), and a third RS (i.e., another Odd-Hop RS) corresponds to a subordinate relay station of the second RS.

Figure 2:
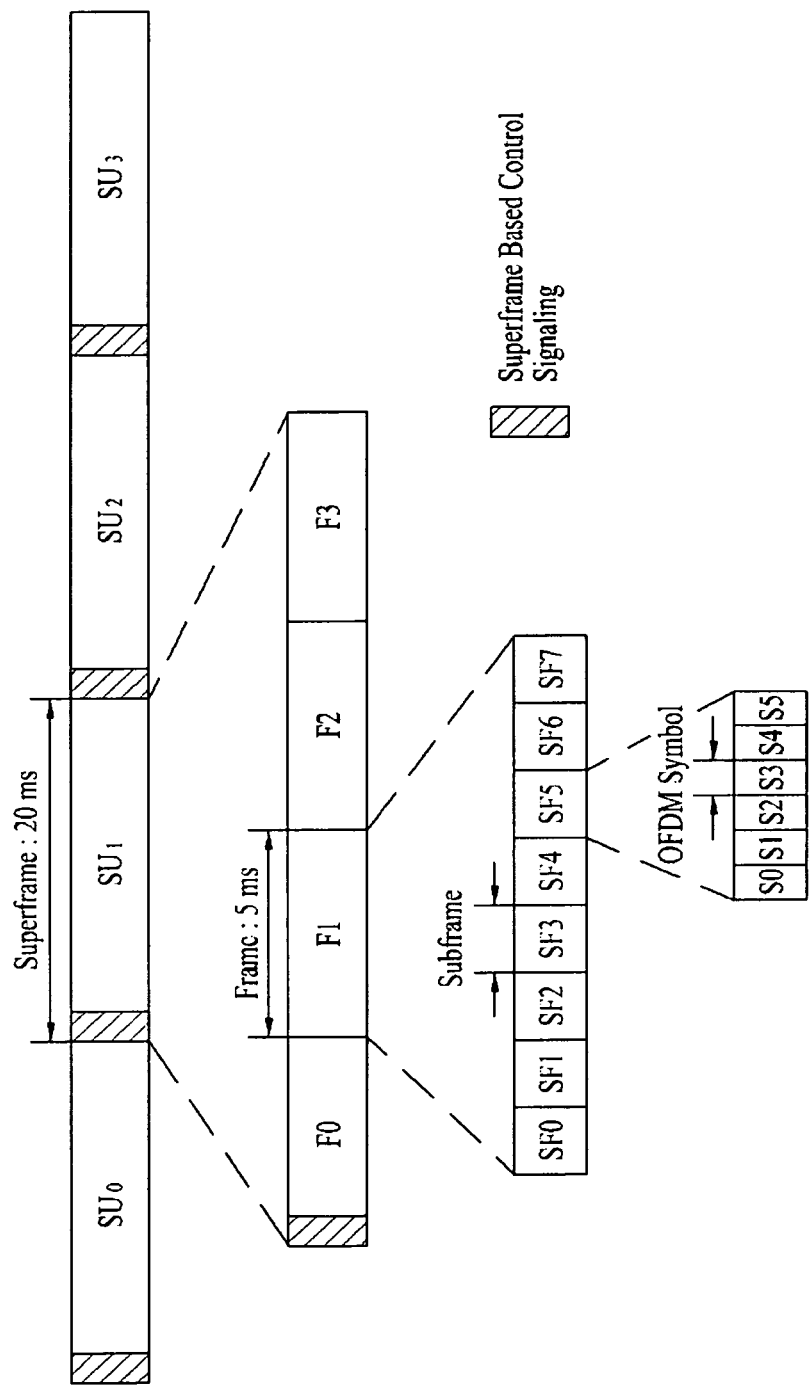
FIG. 2 illustrates an exemplary frame structure that can be used in the embodiments of the present invention.

FIG. 2 illustrates an exemplary frame structure that can be used in the embodiments of the present invention.

Referring to FIG. 2, a Super Frame (20 ms: SU 1) includes at least one or more frames (e.g., F0, F1, . . . , F3), and a frame includes at least one or more subframes (e.g., SF0, SF1, SF7). Furthermore, a subframe may include at least one or more OFDMA symbols.

The length and number of super frames, subframes, and symbols may be adjusted upon request of the user or with respect to the system environment. The term 'subframe' is used in the embodiments of the present invention. At this point, the term 'subframe' represents all lower frame structures that are created by dividing a single frame into units of a predetermined length.

The subframe structure used in the embodiments of the present invention may be configured by dividing a generally used frame into at least one or more subframes. At this point, the number of subframes included in the frame may be decided based upon the number of symbols configuring a subframe. For example, it is assumed that one frame is configured of 48 symbols. If one subframe is configured of 6 symbols, then the frame may be configured of 8 subframes. Alternatively, if one subframe is configured of 12 symbols, then the frame may be configured of 4 subframes.

As shown in FIG. 2, it is assumed that the length of one super frame is 20 ms, and that the length of one frame is 5 ms. More specifically, in this case, the super frame may be configured of 4 frames. Also, one frame has a structure that is configured of 8 subframes. At this point, one subframe may be configured of 6 OFDMA symbols.

As shown in FIG. 2, each super frame may include a Superframe Header (SFH). In the embodiments of the present invention, the Superframe Header (SFH) may be referred to as a Superframe based Control Signaling (or a (Superframe based Control Signal).

Figure 3:
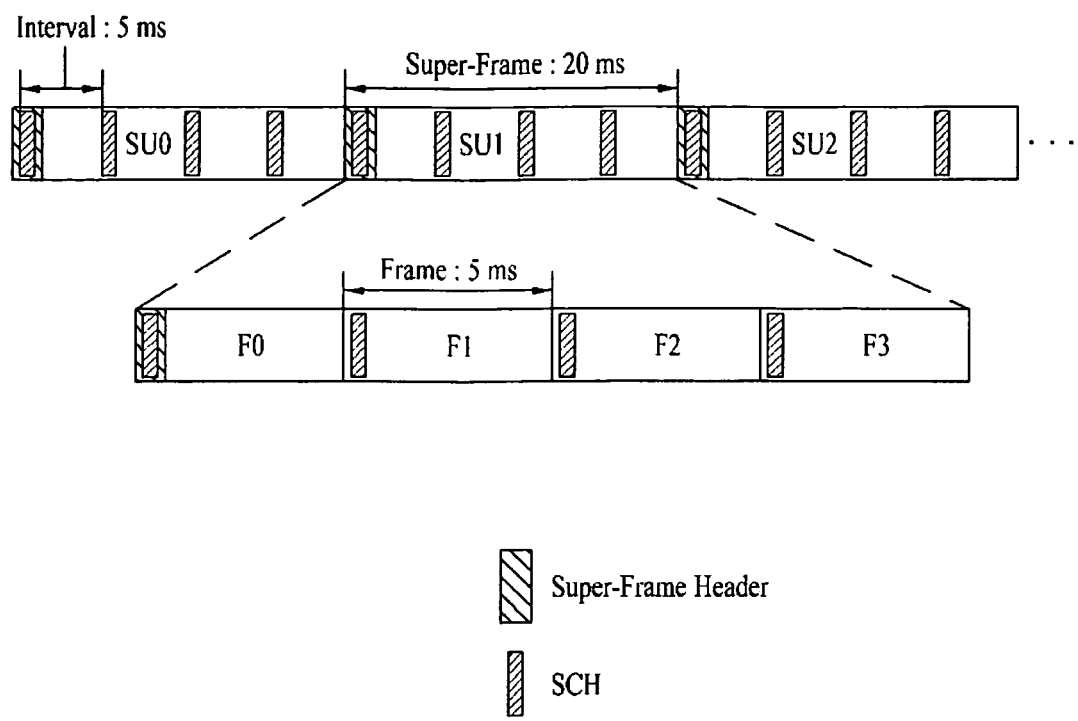
FIG. 3 illustrates an exemplary transmission position of a synchronization channel being used in the embodiments of the present invention.

FIG. 3 illustrates an exemplary transmission position of a synchronization channel being used in the embodiments of the present invention.

One Synchronization Channel (SCH) is configured of at least one or more OFDM symbols. At this point, in the embodiments of the present invention, the Synchronization Channel (SCH) may be transmitted at a frequent transmission cycle period (e.g., 5 ms). In the embodiments of the present invention, the number of OFDM symbols configuring the SCH and the transmission cycle period of the SCH may be adjusted upon request of the user or with respect to the system environment.

Referring to FIG. 3, the base station may transmit a synchronization channel (SCH) for each frame (5 ms) included in the super frame to the terminal. Evidently, the base station may also transmit a synchronization channel (SCH) for each set of 2 or more frames to the terminal. Furthermore, the base station may also transmit a synchronization channel (SCH) for each subframe or each set of 2 or more subframes to the terminal.

Figure 4:
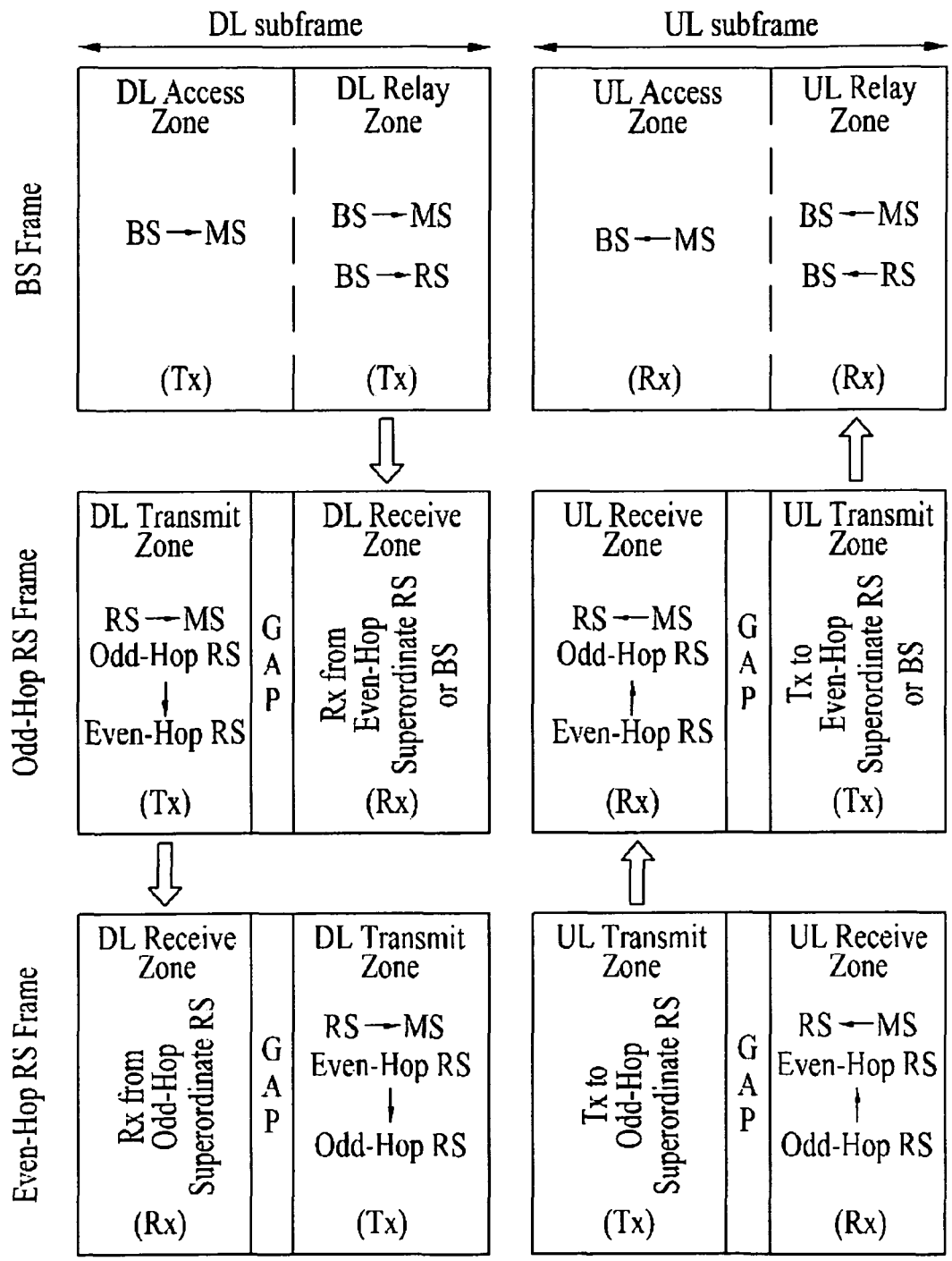
FIG. 4 illustrates an exemplary uni-directional (or one-way) Relay Frame Structure that can be used in the embodiments of the present invention.

FIG. 4 illustrates an exemplary uni-directional (or one-way) Relay Frame Structure that can be used in the embodiments of the present invention.

In the embodiments of the present invention, the Relay Station (RS) may be divided into an Odd Hop RS and an Even Hop RS based upon the number of hops with the base station (BS). The Odd Hop RS and the Even Hop RS may respectively have a hierarchical structure. And, one network may include at least one or more Odd Hop RSs and one or more Even Hop RSs.

The frame structure used in the base station may be configured of uplink and downlink frame structures. At this point, the downlink frame structure may include a downlink (DL) Access Zone and a downlink (DL) Relay Zone, and the uplink frame structure may include an uplink (UL) Access Zone and an uplink (UL) Relay Zone.

Herein, the downlink (DL) Access Zone represents a section where the base station (BS) transmits data packets to the mobile station (MS) (or terminal), and the uplink (UL) Access Zone represents a section where the mobile station (MS) transmits data packets to the base station (BS). Also, in the downlink (DL) Relay Zone, the base station (BS) may relay data packets to the mobile station (MS) or the relay station (RS). And, in the uplink (UL) Relay Zone, the mobile station (MS) or the relay station (RS) may relay data packets to the base station (BS).

The frame structure used in the Odd Hop RS may include a transmit zone and a receive zone. For example, the downlink may be configured of a downlink (DL) Transmit Zone and a downlink (DL) Receive Zone. Also, the uplink may be configured of an uplink (UL) Transmit Zone and an uplink (UL) Receive Zone.

The Odd Hop relay station (RS) may relay and transmit data packets in the downlink transmit zone to the mobile station (MS) or the subordinate relay station (or Even Hop relay station). Also, the Odd Hop relay station (RS) may receive data packets relayed from the subordinate relay station (or Even Hop relay station) in the downlink receive zone.

The Odd Hop relay station (RS) may receive data packets relayed from the mobile station (MS) or the subordinate relay station (or Even Hop relay station) in the uplink receive zone. Also, the Odd Hop relay station (RS) may transmit data relayed from the subordinate relay station or mobile station in the uplink transmit zone to the superordinate relay station (or base station).

The frame structure used in the Even Hop RS may include a transmit zone and a receive zone. For example, the downlink may be configured of a downlink (DL) Transmit Zone and a downlink (DL) Receive Zone. Also, the uplink may be configured of an uplink (UL) Transmit Zone and an uplink (UL) Receive Zone.

At this point, the frame structure used in the Even Hop RS is similar to the frame structure used in the Odd Hop RS. However, in case of the Even Hop RS, the superordinate RS may corresponds to the Odd Hop RS, and the subordinate RS may correspond to the mobile station (or terminal) or another Odd Hop RS.

Figure 5:
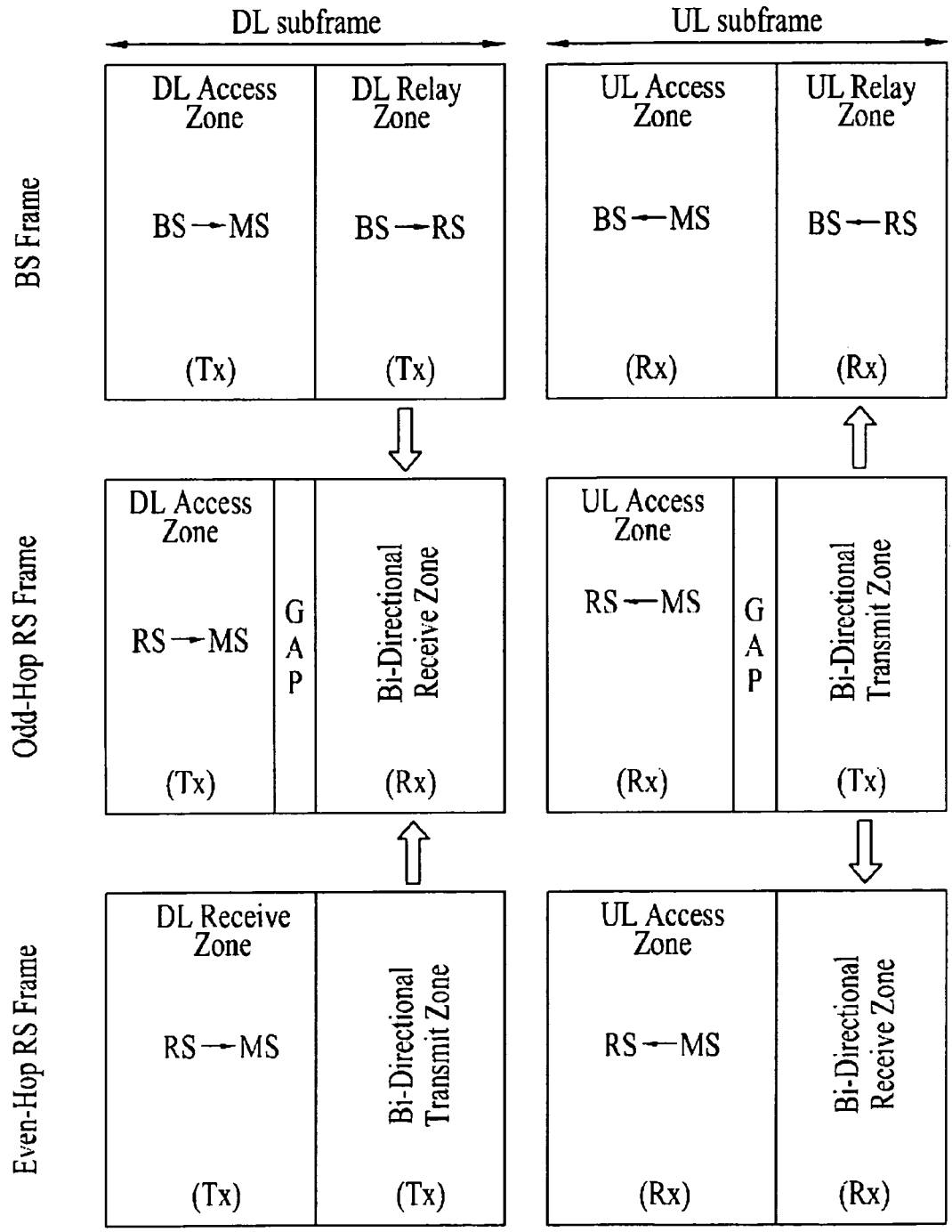
FIG. 5 illustrates an exemplary bi-directional relay frame that can be used in the embodiments of the present invention.

FIG. 5 illustrates an exemplary bi-directional relay frame that can be used in the embodiments of the present invention.

FIG. 5 is different from FIG. 4 in that the relay frame of FIG. 5 has a Bi-Directional Transmit Zone and a Bi-Directional Receive Zone. In FIG. 5, the frame structure used in the base station may include a downlink subframe and an uplink subframe. At this point, the downlink subframe may include a downlink access zone and a downlink relay zone. Also, the uplink subframe may include an uplink access zone and an uplink relay zone.

At this point, the base station may transmit data packets from the downlink access zone to the mobile station. And, the base station may relay data packets from the downlink relay zone to the relay station. Additionally, the base station may receive data packets from the downlink access zone to the mobile station.

The frame structure used in the Odd Hop Relay Station may include a downlink access zone, a downlink (DL) Bi-Directional Receive Zone, an uplink access zone, and an uplink (UL) Bi-Directional Transmit Zone. Herein, a gap zone may be included between the downlink access zone and the DL Bi-Directional Receive Zone and also between the uplink access zone and the UL Bi-Directional Transmit Zone, as a protection section.

The frame structure used in the Even Hop Relay Station may include a downlink access zone, a downlink (DL) Bi-Directional Transmit Zone, an uplink access zone, and an uplink (UL) Bi-Directional Receive Zone.

The Bi-Directional Transmit Zone may transmit data packets relayed to the superordinate relay station or subordinate relay station to the transmission section of the Odd Hop Relay Station or the Even Hop Relay Station. Also, the Bi-Directional Receive Zone may receive data packets relayed from the Odd Hop Relay Station or the Even Hop Relay Station.

As shown in FIG. 5, the downlink access zone represents a section where the base station transmits data packets to the mobile station, or where the relay station transmits the relayed data packets to the mobile station. Also, the uplink access zone represents a section where the mobile station transmits data packets to the base station, or where the mobile station transmits data packets to the Odd Hop Relay Station or the Even Hop Relay Station.

The frame structure shown in FIG. 4 and FIG. 5 represents a case where TDD is supported within a frame having a cycle period of 5 ms. FIG. 4 and FIG. 5 may be expanded to an FDD and adopted accordingly, thereby being interpreted as TDD/FDD mode operations for multiple framed. Also, the identification of each zone may be set in subframe units for a frame configured of one or more subframes, or may be set in frame units for one or more frames.

In the embodiments of the present invention, the part that has been defined as the preamble may be expanded to the same definition of a super frame header including a broadcast channel (BCH). Also, the preamble may include the synchronization channel (SCH) and the broadcast channel (BCH), and the preamble may also be used as the synchronization channel (SCH) or the broadcast channel (BCH).

Figure 6:
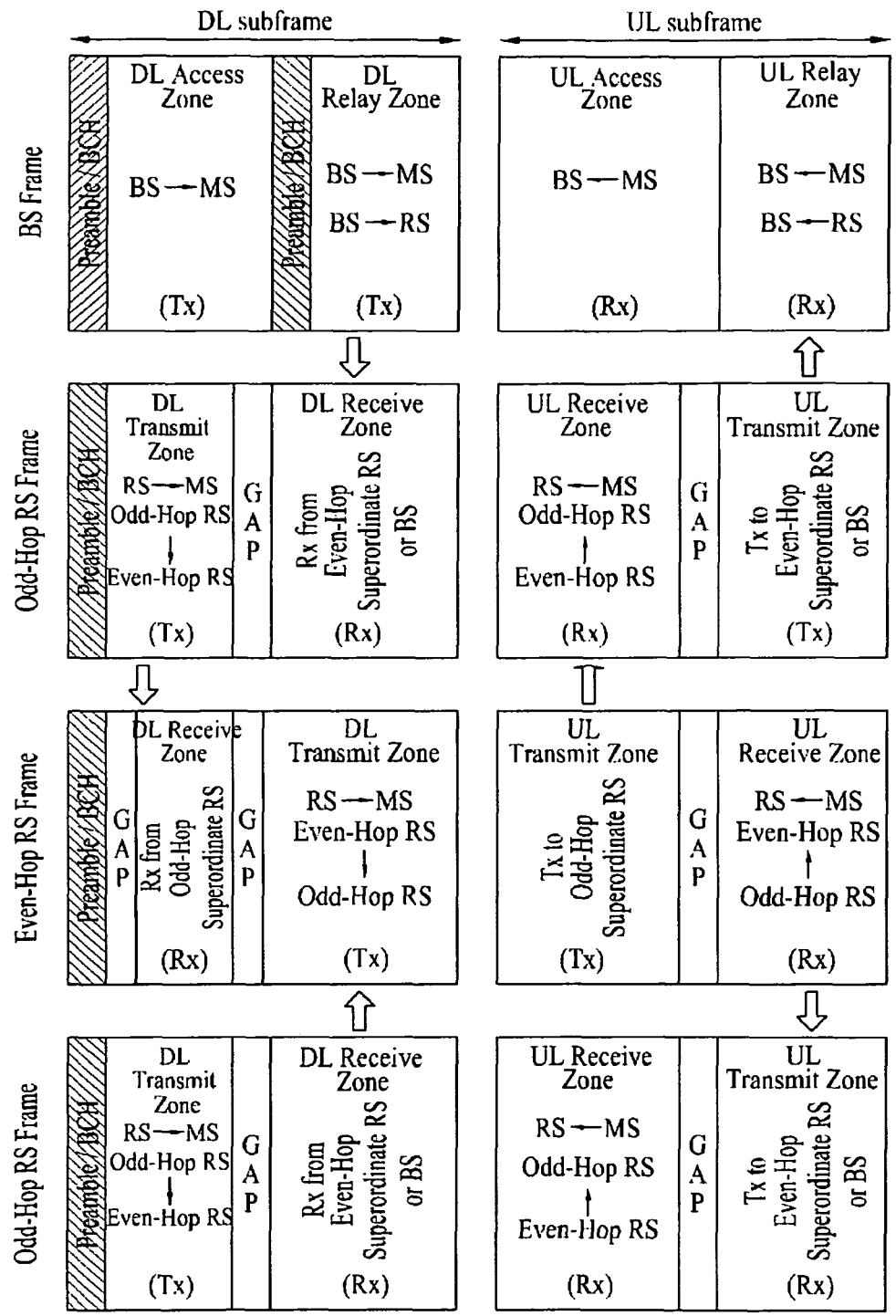
FIG. 6 illustrates an exemplary one-way (or uni-directional) relay structure having a common preamble transmission position according to an embodiment of the present invention.

FIG. 6 illustrates an exemplary one-way (or uni-directional) relay structure having a common preamble transmission position according to an embodiment of the present invention.

FIG. 6 may basically use the uni-direction relay frame structure of FIG. 4. However, in FIG. 6, each of the relay stations may transmit a SCH to the mobile station at the same time the base station transmits the SCH, regardless of the number of hops. For example, the relay station of the Odd Hop may transmit the SCH from the downlink transmit zone, and the relay station of the Even Hop may transmit the SCH from the downlink receive zone. More specifically, the Even Hop RS may transmit an SCH to the subordinate RS (another Odd Hop RS) at the same time the superordinate RS (an Odd Hop RS) transmits the SCH.

Each relay station may transmit an SCH to the mobile terminal and subordinate RS, which are included in the relay station from at least one frame, only once. However, when the subordinate RS corresponds to the Mobile RS, there may be a problem in ensuring a periodic synchronization. For example, since a Half-Duplex RS (e.g., uni-directional RS) operates only in a transmission or reception mode, in order to detect the preamble transmitted by the superordinate RS (or base station), the uni-directional RS requires a method for transmitting a preamble used in the downlink transmit zone and receive zone and in the uplink transmit zone and receive zone.

In FIG. 6, the Odd Hop RS and the Even Hop RS may transmit the preamble at the same time as the transmission point of a preamble from the base station. In this case, since the Odd Hop RS may transmit the data packets from the downlink transmit zone, the downlink subframe does not require an additional time gap between the preamble and the downlink transmit zone. However, in case of the Even Hop RS, in order to transmit the preamble from the downlink receive zone, a predetermined time gal between the preamble and the downlink receive zone is required.

As shown in FIG. 6, by having the base station and relay stations transmit a preamble at the same time point, the mobile station (or terminal) may acquire a preamble and a Broadcast Control Information or a System Control Information at the same time point, regardless of the base station and the relay station.

Figure 7:
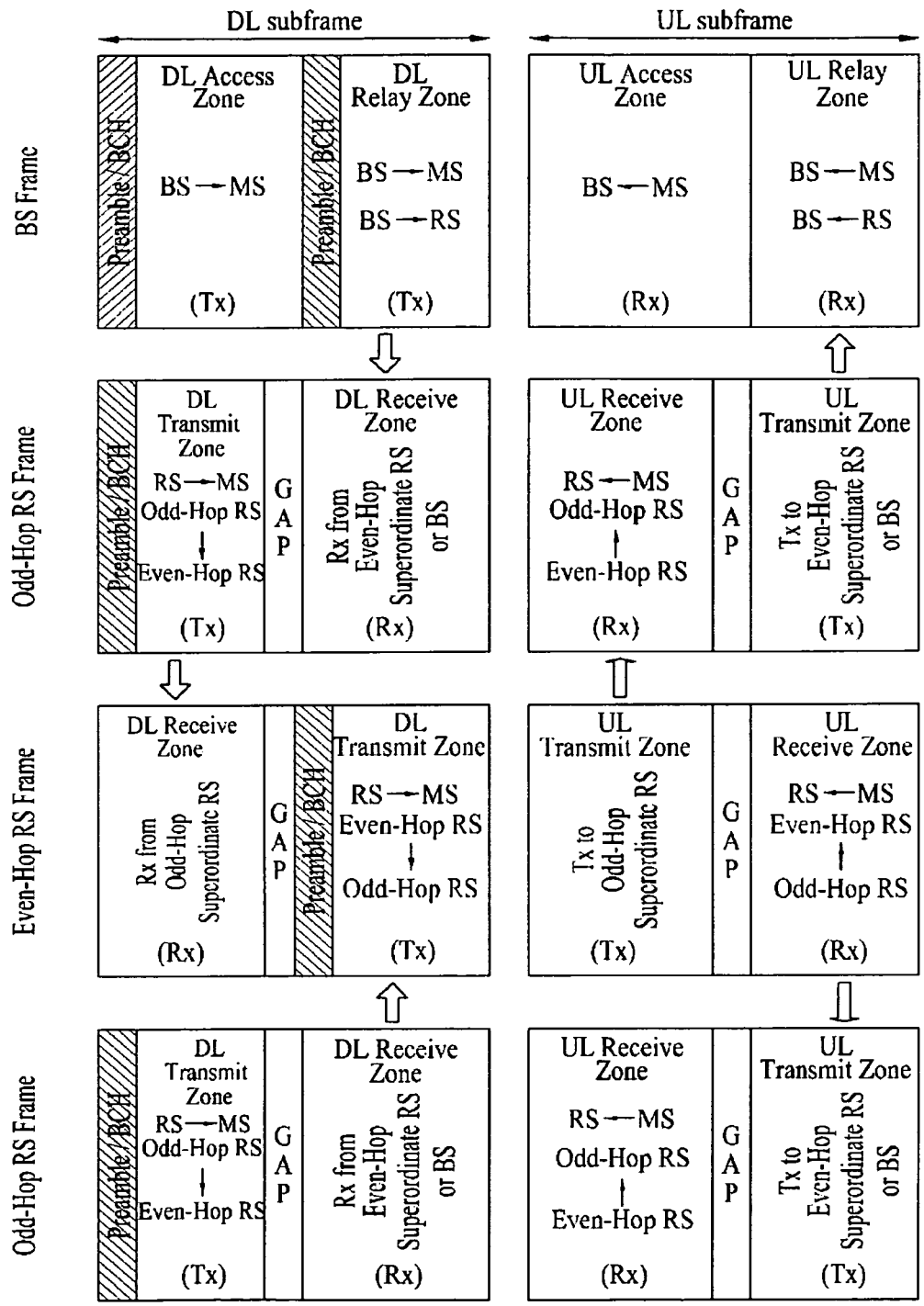
FIG. 7 illustrates an exemplary one-way (or uni-directional) relay structure having a stagger-type frame structure according to an embodiment of the present invention.

FIG. 7 illustrates an exemplary one-way (or uni-directional) relay structure having a stagger-type frame structure according to an embodiment of the present invention.

If the preamble is always transmitted from the same position, it may be difficult for the RS, which is required to acquire the same information from the superordinate RS, to receive the preamble or the broadcast channel. Therefore, FIG. 7 illustrates a new frame structure for such RS.

It is assumed that FIG. 7 basically uses the frame structure of FIG. 4. However, in this case, it is assumed that both Odd Hop RS and Even Hop RS transmit the preamble to the mobile station or subordinate RS from the downlink transmit zone. For example, the even hop RS may transmit the preamble to the terminal or subordinate RS having a predetermined time offset, after the odd hop RS has transmitted the preamble.

More specifically, by having the base station and RS transmit the preamble using a staggering method, the mobile station may easily acquire synchronization and system information of the uni-directional RS, which operated in the half-duplex mode. Also, since additional RS-specific channel configuration is not required, an overhead may be reduced.

As described in the embodiments of the present invention, the base station or relay station may transmit at least one preamble from one frame. At this point, the base station or relay station may transmit the preamble in multiple frame units. Also, each frame structure may be interpreted as a specific frame structure from which a predetermined preamble is transmitted.

Figure 8:
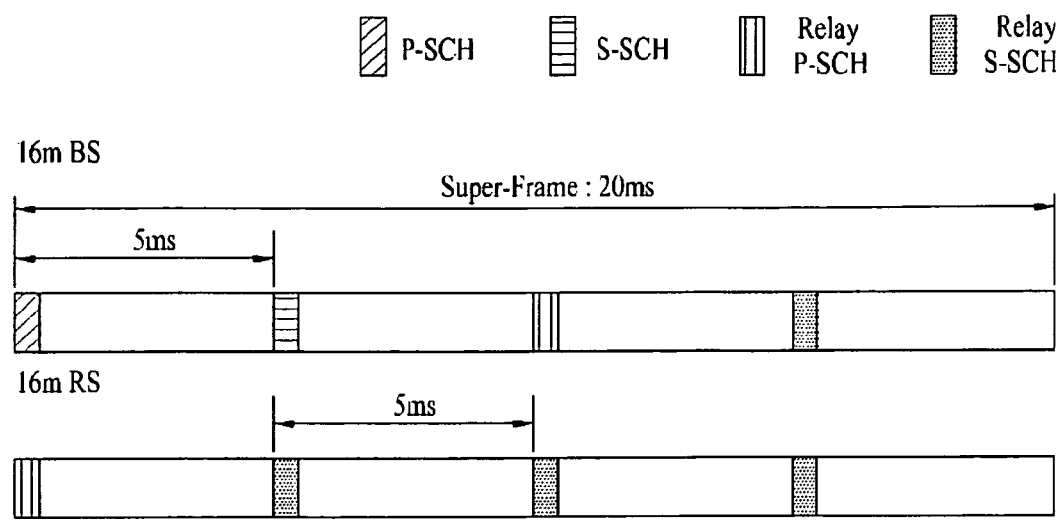
FIG. 8 illustrates an exemplary frame structure being used in a base station (BS) and a relay station (RS) according to an embodiment of the present invention.

FIG. 8 illustrates an exemplary frame structure being used in a base station (BS) and a relay station (RS) according to an embodiment of the present invention. FIG. 8 illustrates a non-Transparent frame structure. In FIG. 8, a Primary SCH (P-SCH), a Secondary SCH (S-SCH), a Relay Primary SCH (R_P-SCH), and a Relay Secondary SCH (R_S-SCH) may be used. For example, the base station may transmit super frame synchronization information for ensuring initial synchronization of the mobile station and RS and may also transmit additional information through the P-SCH. Also, the base station uses the S-SCH so as to transmit supplemental information for acquiring fine synchronization and to transmit cell/sector ID information.

Furthermore, the relay station (RS) may transmit additional information through the relay P-SCH for the RS and for the mobile station attempting to ensure initial synchronization. The subordinate RS or mobile station may use the relay P-SCH to acquire the initial synchronization. The relay station may use the relay S-SCH to transmit a Cell/Sector identifier (ID) of the relay station (RS) or to transmit an RS ID for RS identification to the mobile terminal or subordinate RS.

In FIG. 8, the Even Hop RS or the Odd Hop RS may transmit the Relay P-SCH and the Relay S-SCH to the mobile terminal or subordinate RS at the same time as the transmission point of the preamble (or P-SCH/S-SCH) included in the base station (BS). Herein, in case of the odd hop RS, since the Relay P-SCH or the Relay S-SCH is transmitted from the DL transmit zone, additional time gap is not required. However, in case of the even hop RS, a time gap is required in-between preamble transmission so that the even hop RS can be operated in the DL receive zone.

As described above, by having the RS and BS transmit the preamble to the mobile station or subordinate RS at the same time point, the mobile station and RS attempting an Initial Network Entry may acquire preambles (P-SCH or S-SCH) and broadcast/system control information at the same time point.

However, since the subordinate RS having a transmission path decided therein periodically requires the acquisition of synchronization information from the base station or superordinate RS, it may be difficult for the subordinate RS to receive the preambles (or BCH). Therefore, in order to resolve this problem, the transmission of a synchronization signal for the RS or the transmission of a control signal is additionally required.

In FIG. 8, the base station (BS) may generally use a SuperFrame Header (SFH) so as to transmit a P-SCH, which is configured of at least one or more OFDM symbols, in units of 20 ms. If the relay station corresponds to a multi-hop RS, the odd-hop or even-hop information may be included in the Relay P-SCH or the Relay S-SCH. The Relay S-SCH may also include supplemental information in addition to the hop information. For example, if the hop information corresponds to 1 bit, '1' may indicate the odd hop, and '0' may indicate the even hop.

The relay station may transmit the relay P-SCH to the subordinate RS or mobile station at the same time point as the P-SCH of the base station. For example, the relay station may transmit the SuperFrame Header (SFH) including the relay P-SCH, and may transmit the relay S-SCH from the first OFDM symbol of each frame in 5 ms units. Also, the relay station may transmit the Relay P-SCH and the Relay S-SCH to the mobile station from the DL transmit zone. At this point, the relay station may notify the transmission position of the Relay P-SCH and the Relay S-SCH to the mobile station or subordinate RS through the BCH.

The relay station may transmit the relay S-SCH to the mobile station or subordinate RS at the same time as the point when the S-SCH of the base station is being transmitted. Furthermore, the relay station may transmit additional information for periodically ensuring the subordinate RS from the downlink transmit zone.

Figure 9:
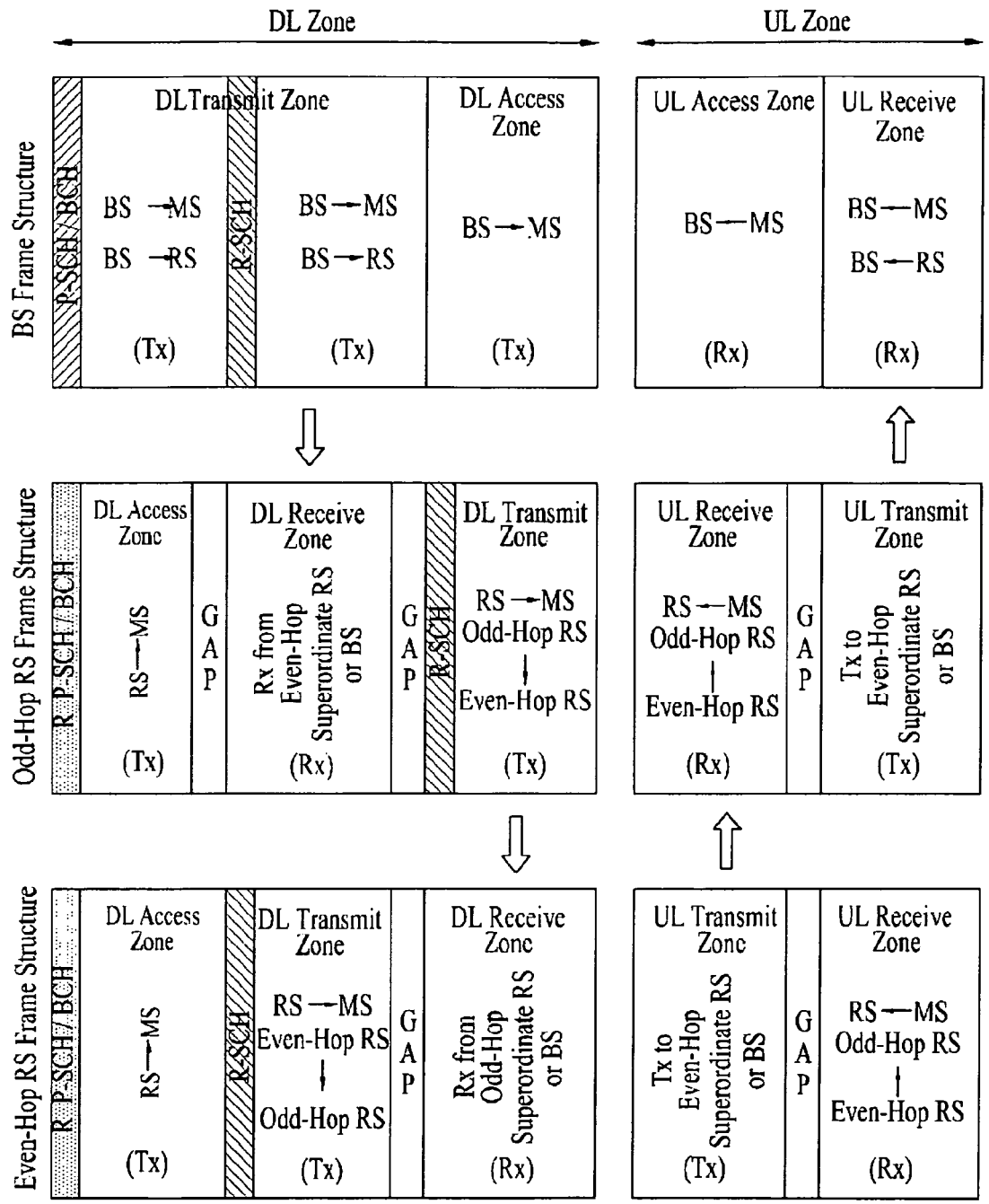
FIG. 9 illustrates an exemplary one-way (or uni-directional) relay structure having a non-transparent frame structure according to an embodiment of the present invention.

FIG. 9 illustrates an exemplary one-way (or uni-directional) relay structure having a non-transparent frame structure according to an embodiment of the present invention.

FIG. 9 illustrates a case where a Transparent mode RS and a Non-Transparent RS co-exist in the service region (or zone) of the base station. At this point, the Transparent mode RS signifies that the mobile station can immediately receive the control signal (e.g., SCH or BCH) or map information from the base station. More specifically, in the Transparent mode, the base station may control the relay station so as to transmit the control signals to the mobile station. The Non-Transparent mode is used when the mobile terminal exists outside of the cell boundary or cell coverage of the base station, and the Non-Transparent mode shows that the relay station can transmit control signals or map information to the mobile station.

Referring to FIG. 9, the frame structure used by the base station will now be described. The downlink zone of the base station may be configured of the downlink transmit zone and the downlink access zone. And, the uplink zone of the base station may be configured in the order of the uplink access zone and the uplink receive zone.

Also, the frame structure used by the Odd-Hop relay station will now be described. The downlink zone of the Odd-Hop relay station may be configured in the order of the downlink access zone, the downlink receive zone, and the downlink transmit zone. The uplink zone of the Odd-Hop relay station may be configured of the uplink receive zone and the uplink transmit zone.

Moreover, the frame structure used by the Even-Hop relay station will now be described. The downlink zone of the Even-Hop relay station may be configured in the order of the downlink access zone, the downlink receive zone, and the downlink transmit zone. The uplink zone of the Even-Hop relay station may be configured by order of the uplink transmit zone and the uplink receive zone.

In FIG. 9, if the frame structure is configured of super frame units, the base station may transmit a P-SCH in order to synchronize the first frame (or subframe) of the super frame with the mobile station. Also, the base station may transmit a Relay SCH (R-SCH) in order to synchronize the next frame (or next subframe) of the super frame with the relay station (RS). The R-SCH may be used to be in synchronization with the relay stations from the base station, or to be in synchronization with a subordinate RS from a specific relay station.

The Odd-Hop RS and the Even-Hop RS may transmit a Relay P-SCH (R_P-SCH)) to the mobile station or subordinate RS at the same time point where the base station transmits the P-SCH. However, each of the Odd-Hop RS and the Even-Hop RS may transmit a Relay SCH (R-SCH) to the mobile station or subordinate RS from the respective downlink transmit zone. More specifically, each RS may use a stagger method or an offset method to transmit a Relay SCH (R-SCH) to the mobile station or subordinate RS.

Figure 10:
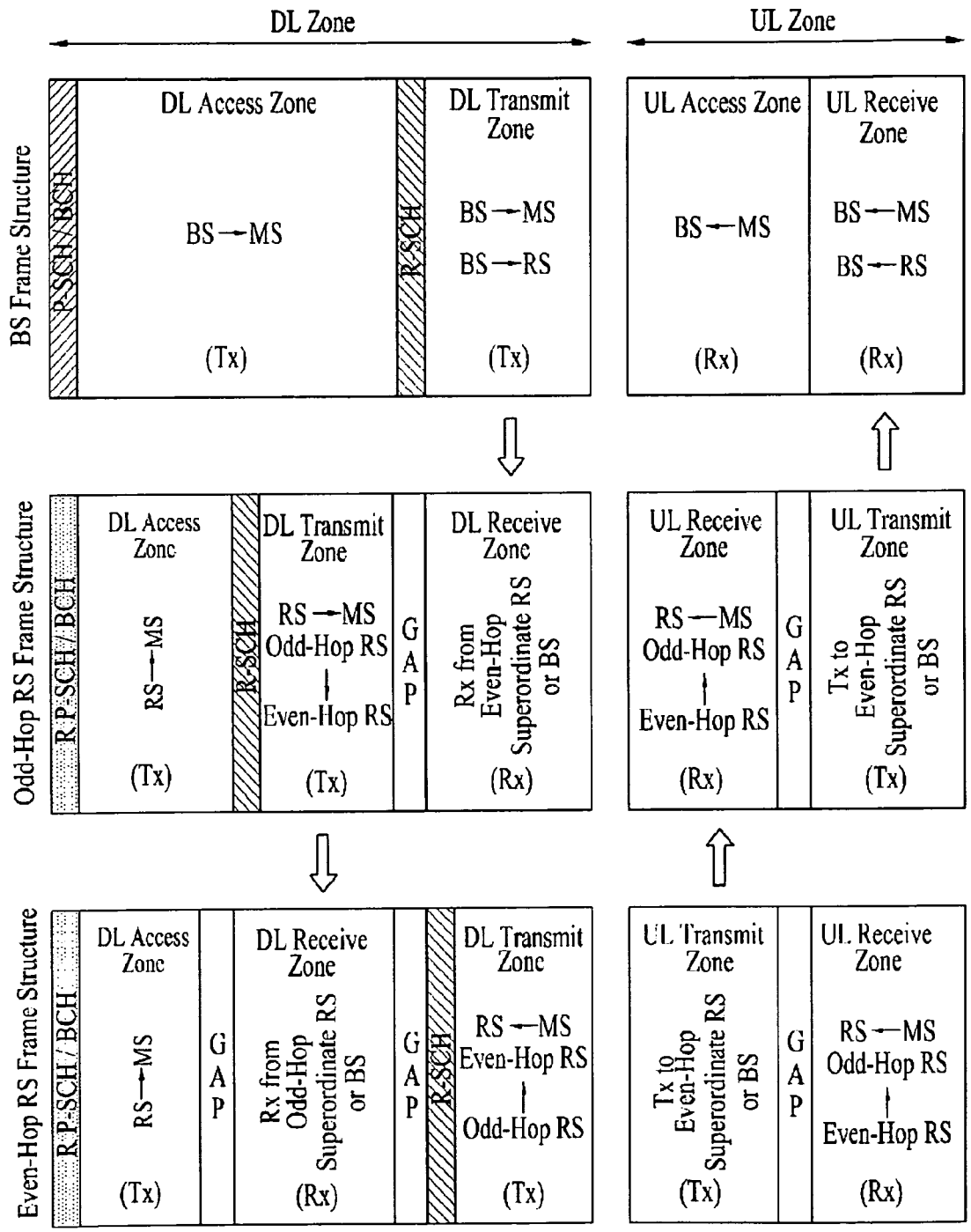
FIG. 10 illustrates another exemplary one-way (or uni-directional) relay structure having a non-transparent frame structure according to an embodiment of the present invention.

FIG. 10 illustrates another exemplary one-way (or unidirectional) relay structure having a non-transparent frame structure according to an embodiment of the present invention.

FIG. 10 illustrates a case where the Non-Transparent Mode RS exists in the service zone (or region) of the base station. FIG. 10 is basically similar to FIG. 9. However, there is a difference in the frame structure between FIG. 9 and FIG. 10.

Referring to FIG. 10, the frame structure used by the base station will now be described. The downlink zone of the base station may be configured of the downlink transmit zone and the downlink access zone. And, the uplink zone of the base station may be configured in the order of the uplink access zone and the uplink receive zone.

Also, the frame structure used by the Odd-Hop relay station will now be described. The downlink zone of the Odd-Hop relay station may be configured in the order of the downlink access zone, the downlink transmit zone, and the downlink receive zone. The uplink zone of the Odd-Hop relay station may be configured of the uplink receive zone and the uplink transmit zone.

Moreover, the frame structure used by the Even-Hop relay station will now be described. The downlink zone of the Even-Hop relay station may be configured in the order of the downlink access zone, the downlink receive zone, and the downlink transmit zone. The uplink zone of the Even-Hop relay station may be configured by order of the uplink transmit zone and the uplink receive zone.

Referring to FIG. 10, the Odd-Hop RS and the Even-Hop RS may transmit a Relay P-SCH (R_P-SCH)) to the mobile station or subordinate RS at the same time point where the base station transmits the P-SCH. Also, each of the Odd-Hop RS and the Even-Hop RS may transmit a Relay SCH (R-SCH) to the mobile station or subordinate RS from the respective downlink transmit zone. More specifically, each RS may use a stagger method or an offset method to transmit a Relay SCH (R-SCH) to the mobile station or subordinate RS.

In FIG. 9 and FIG. 10, the downlink transmit zone of the base station may chronologically establish with the receive zone of the Odd-Hop RS, and the transmit zone of the Odd-Hop RS may chronologically establish with the receive zone of the Even-Hop RS.

In FIG. 9 and FIG. 10, each RS may transmit an R_P-SCH to the subordinate RS or mobile station at the same time point as the time point where the P-SCH of the base station is transmitted, and the R-SCH may be transmitted to the subordinate RS or mobile station from the downlink transmit zone of each RS. The R-SCH may include additional information so that the subordinate RS or mobile station can periodically ensure synchronization. The mobile station and the subordinate RS may receive the R-SCH so as to acquire an accurate synchronization with the base station or superordinate RS. Also, by receiving the R-SCH, the mobile station and the subordinate RS may acquire hop information and an RS identifier (RS ID) for each RS.

Figure 11:
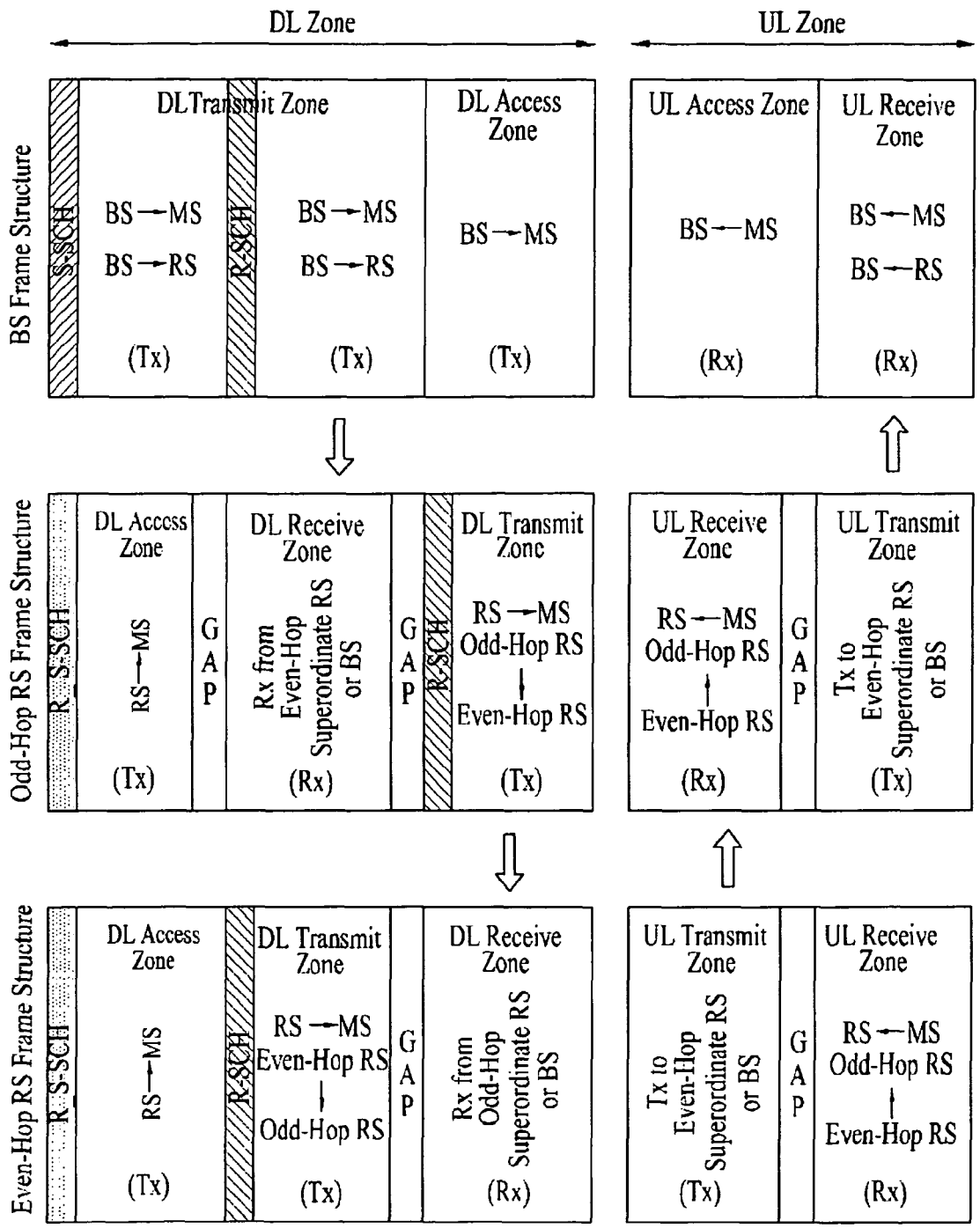
FIG. 11 and FIG. 12 respectively illustrate other exemplary one-way (or uni-directional) relay structures each having a non-transparent frame structure according to an embodiment of the present invention.
Figure 12:
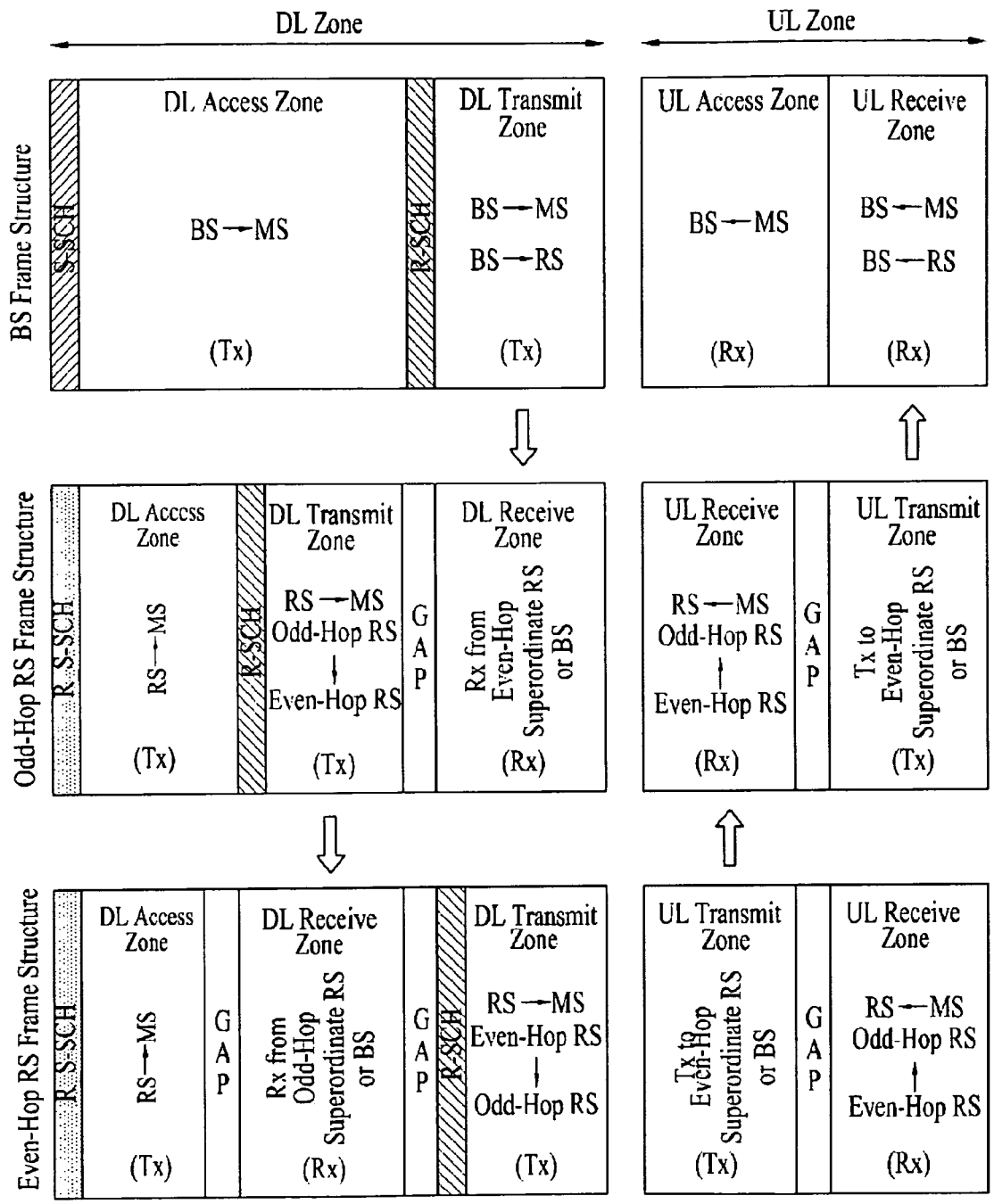

FIG. 11 and FIG. 12 respectively illustrate other exemplary one-way (or uni-directional) relay structures each having a non-transparent frame structure according to an embodiment of the present invention.

FIG. 11 and FIG. 12 are basically similar to FIG. 9 and FIG. 10. However, FIG. 11 and FIG. 12 respectively illustrate a case where the frame structure is configured in a frame structure and not in a super frame structure. FIG. 11 illustrates a frame structure when considering the Transparent Mode RS and the Non-Transparent Mode RS, and FIG. 12 illustrates the frame structure of the Non-Transparent Mode BS and RS. Also, FIG. 11 and FIG. 12 respectively illustrate a case where a separate synchronization channel is used apart from the super frame header. Therefore, the base station may use the S-SCH instead of the P-BCH so as to be in synchronization with the mobile station and Relay stations (RSs).

Referring to FIG. 11 and FIG. 12, the Odd-Hop RS or the Even-Hop RS may transmit a Relay S-SCH (R_S-SCH)) to the mobile station at the same time point where the base station transmits the S-SCH and may also transmit additional R-SCH to the mobile station or subordinate RS from the respective downlink transmit zone. At this point, the R-SCH may include information for acquiring periodic synchronization of the mobile station or subordinate RS.

For example, in case of FIG. 11, which considers the Transparent Mode RS and the Non-Transparent Mode RS, in case of the Odd-Hop RS, the frame structure may be configured in the order of the downlink access zone, the downlink receive zone, and the downlink transmit zone. At this point, the uplink frame structure is configured of the uplink receive zone and the uplink transmit zone.

Also, in case of FIG. 12, which considers the frame structure of the Non-Transparent Mode BS and RS, the frame structure used in the Odd-Hop RS may be configured in the order of the downlink access zone, the downlink transmit zone, and the downlink receive zone. At this point, the uplink frame structure is configured in the order of the uplink receive zone and the uplink transmit zone.

The above-described FIG. 8 to FIG. 12 may also be applied in the Bi-Directional multi-hop RS.

Figure 13:
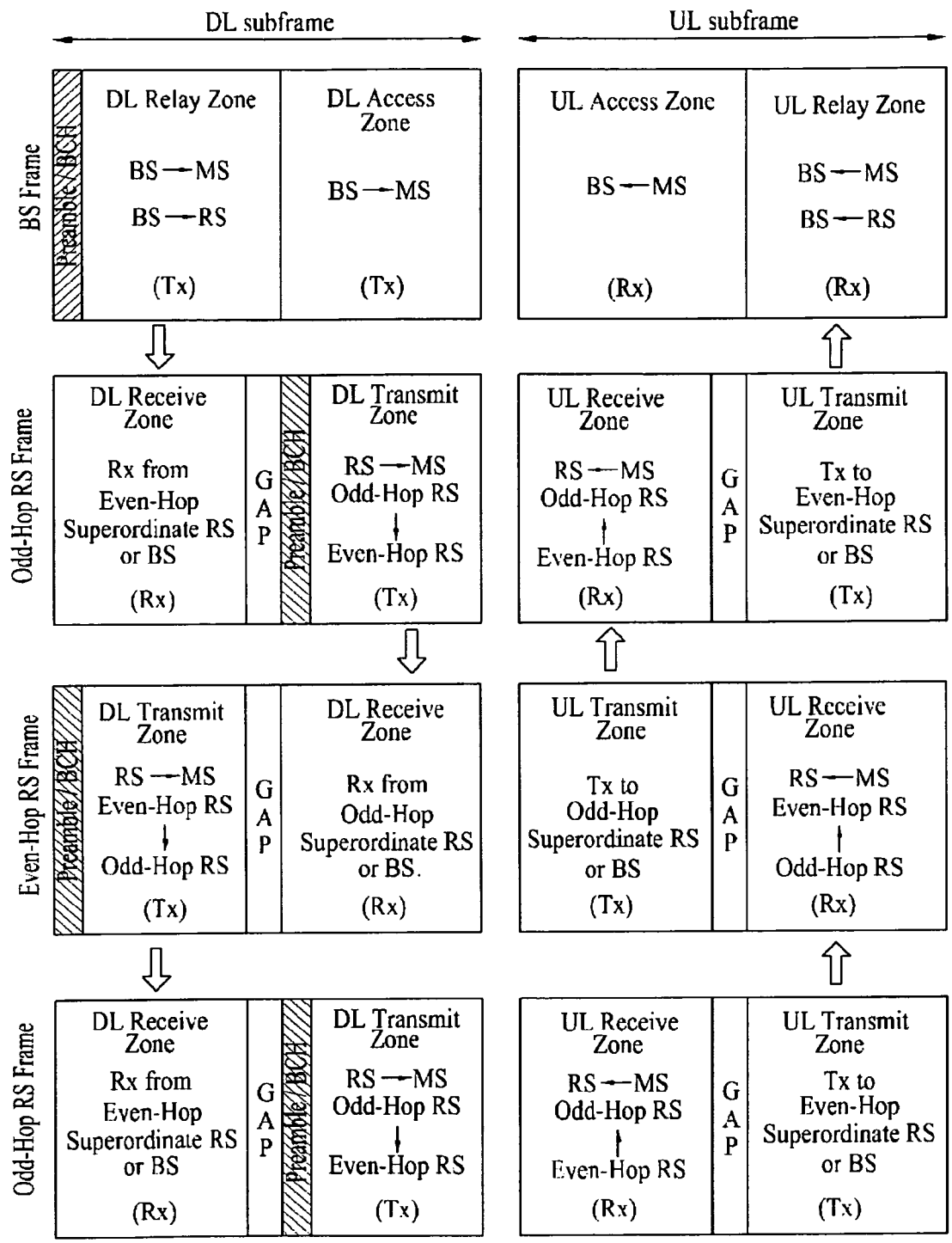
FIG. 13 illustrates an exemplary one-way (or uni-directional) relay structure having an optimized frame structure according to an embodiment of the present invention.

FIG. 13 illustrates an exemplary one-way (or uni-directional) relay structure having an optimized frame structure according to an embodiment of the present invention.

In the method described in FIG. 6 and FIG. 7, the base station should transmit a supplementary preamble (or BCH or SCH) not only for the mobile station but also for the subordinate RS within a cell. Therefore, an overhead of the overall system may be increased.

In FIG. 13, the DL subframe of the base station may be aligned in the order of a DL Relay Zone and a DL access zone, and the DL subframe of the Odd-Hop RS may be aligned in the order of a DL Receive Zone and a DL Transmit zone. Also, in case of the Even-Hop RS, the DL subframe may be aligned in the order of a DL Transmit Zone and a DL Receive Zone.

Therefore, the base station may simultaneously transmit identical preamble and/or system information to the mobile station (MS) and the subordinate RS from the DL Relay Zone. At this point, the frame structure of FIG. 13 corresponds to a structure performing transmission to the mobile station or subordinate RS from the DL Transmit Zone of each RS, which is identical to the frame structure of FIG. 7. The transmission structure of the preamble and/or broadcast channel (BCH) of FIG. 13 is expressed as an essential channel information of the system configuration, and, therefore, when considering latency loss and gain, an irrelevant frame structure may be interpreted as an effective multi-hop frame structure.

Hereinafter, the bi-directional relay frame structure will be described.

Figure 14:
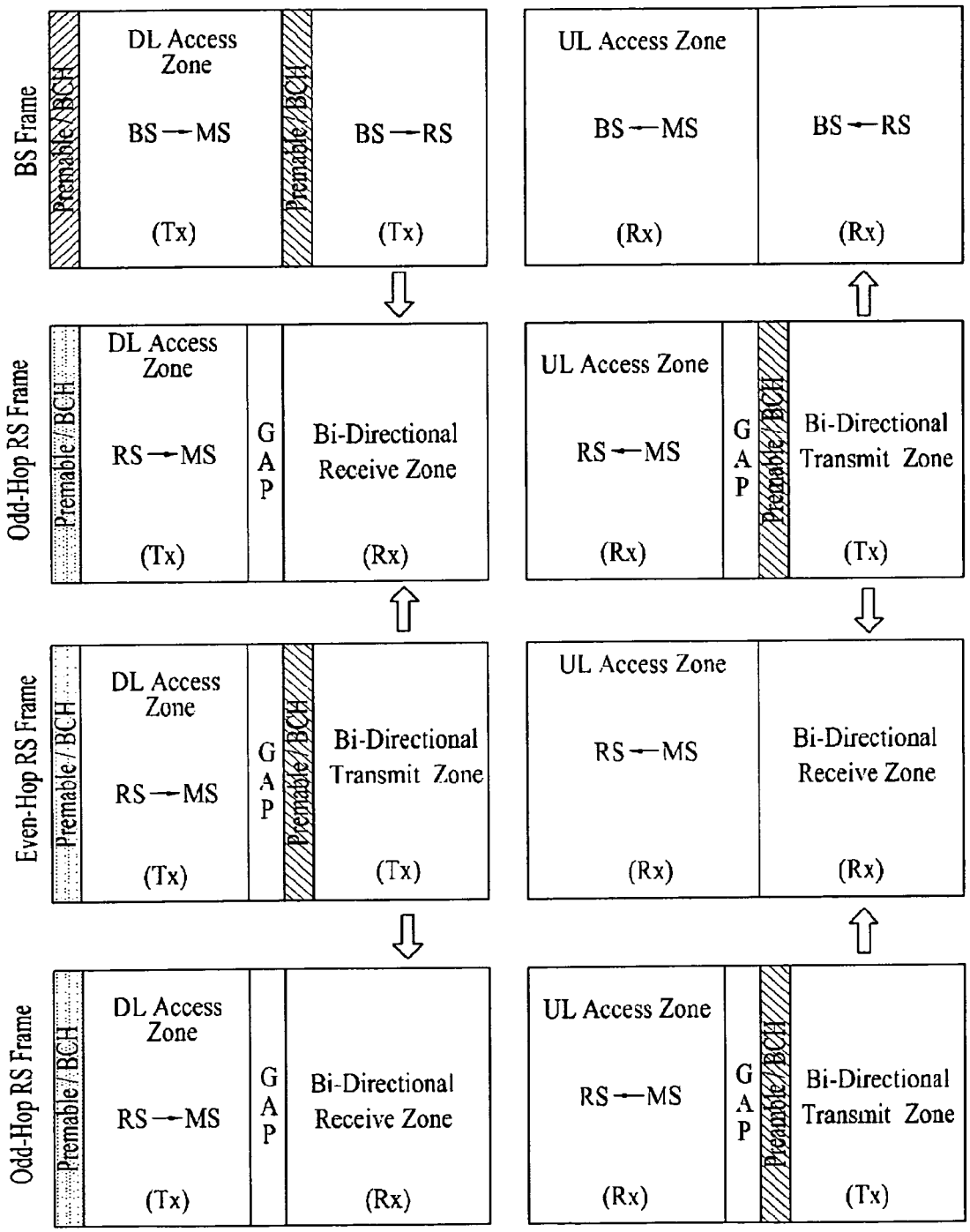
FIG. 14 illustrates an exemplary bi-directional frame structure according to another embodiment of the present invention.

FIG. 14 illustrates an exemplary bi-directional frame structure according to another embodiment of the present invention.

Referring to FIG. 14, the base station may transmit an SCH for ensuring synchronization of each mobile station (MS) and relay station (RS) in the frame structure of a Bi-Directional Relay Zone.

For example, in order to ensure synchronization of the mobile station within the RS zone, the base station may transmit a preamble including the SCH from the DL Access Zone to the mobile station. Also, in order to ensure synchronization with the relay stations (RSs), the base station may transmit a preamble from the DL Relay Zone to the subordinate RS.

Each RS may transmit a preamble to the respective subordinate RS from the bi-directional transmit zone in order to ensure synchronization with the subordinate RSs.

For example, the Odd-hop RS may transmit an SCH to the subordinate RS (e.g., Even-hop RS) from the bi-directional transmit zone after the UL access zone, and the Even-hop RS may transmit an SCH to the subordinate RS (e.g., Odd-hop RS) from the bi-directional transmit zone after the DL access zone.

In FIG. 14, the preamble may include a synchronization channel and/or a broadcast channel. When a broadcast control signal is transmitted from the base station or the relay station, it is preferable that the BCH transmission point from the superordinate RS for the half-duplex RS is performed in the bi-directional transmit zone.

At this point, when the RS transmits the preamble and/or BCH from the UL transmit zone, the mobile station cannot receive the respective BCH. Therefore, the transmission of the preamble and/or BCH from the bi-directional transmit zone to the uplink may have the characteristics of RS-dedicated (or RS-specific) information.

Figure 15:
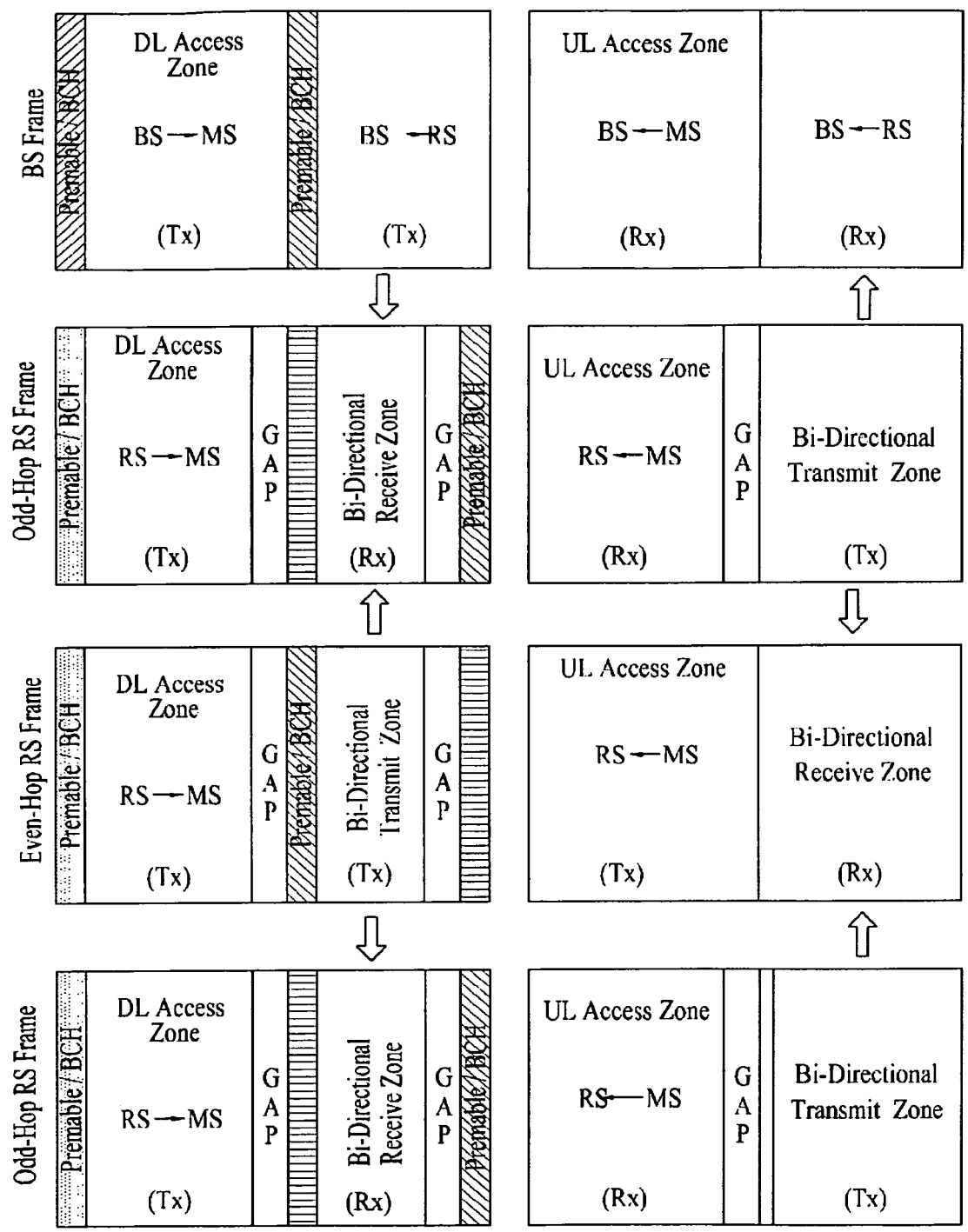
FIG. 15 illustrates another exemplary bi-directional frame structure according to another embodiment of the present invention.

FIG. 15 illustrates another exemplary bi-directional frame structure according to another embodiment of the present invention.

Referring to FIG. 15, the base station may transmit an SCH for ensuring synchronization of each mobile station (MS) and relay station (RS) in the frame structure of a Bi-Directional Relay Zone.

For example, in order to ensure synchronization of the mobile station within the RS zone, the base station may transmit a SCH from the DL Access Zone to the mobile station. Also, in order to ensure synchronization with the subordinate relay station (RS), the base station may transmit a SCH from the DL Relay Zone to the subordinate RS.

FIG. 15 may be used in a Frequency Division Duplex (FDD) method and not in a Time Division Duplex (TDD). More specifically, in the FDD method (e.g., FD-FDD or HD-FDD), it is preferable that the base station and/or relay station uses a different carrier to transmit the preamble or BCH to the mobile station or subordinate RSs. Therefore, it is preferable for the base station and/or relay station to transmit the preamble from the downlink zone and to avoid transmitting the preamble from the uplink zone.

Referring to FIG. 15, the relay station may transmit a preamble and/or BCH from the Bi-Directional Receive Zone and the Bi-Directional Transmit Zone within the downlink subframe. When odd-hop RS or the even-hop RS transmits a preamble (or BCH/SCH) from the Bi-Directional Receive Zone of the downlink subframe, a gap is required in order to shift (or switch) from a receive mode to a transmit mode.

In all of the above-described embodiments of the present invention, in the uni-directional and bi-directional transmit/receive zone, at least one of the preamble, BCH, and SCH may include Hop Information. For example, when the Hop Information has the size of 1 bit, '0' may represent the even hop, and '1' may represent the odd hop. If the Hop information is used in a toggle format, '0' may represent a decrease in the number of hops, and '1' may represent an increase in the number of hops.

The preamble, BCH, and/or SCH may be transmitted in cycle period units of 5 ms or 20 ms and may be varied or adjusted upon request of the user or with respect to the system environment. However, it is preferable that the preamble, BCH, and/or SCH are transmitted in super frame, frame, or subframe units.

If multiple preambles are transmitted from within a single frame, each preamble may perform information transmission using the same transmission structure or may perform information transmission using different transmission structures. For example, in case of a relay station (RS)-dedicated BCH, since the mobile station cannot perform reception, BCH information for the reception of the mobile station may be included herein. Also, in case of a relay station (RS)-dedicated BCH, the amount of information, channel structure, and transmission method may be designed differently from other BCHs.

Figure 16:
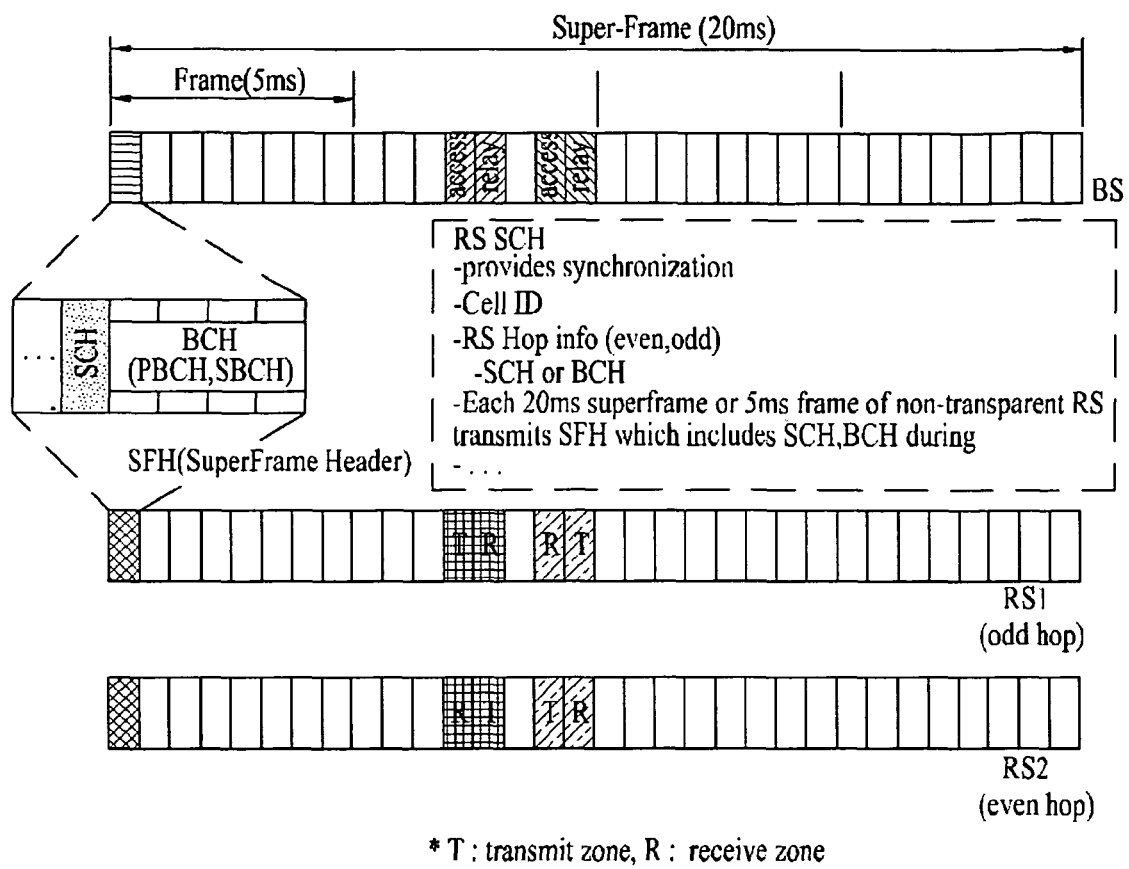
FIG. 16 and FIG. 17 respectively illustrate exemplary transmission methods of a superframe header (SFH) being transmitted from the relay station according to another embodiment of the present invention.
Figure 17:
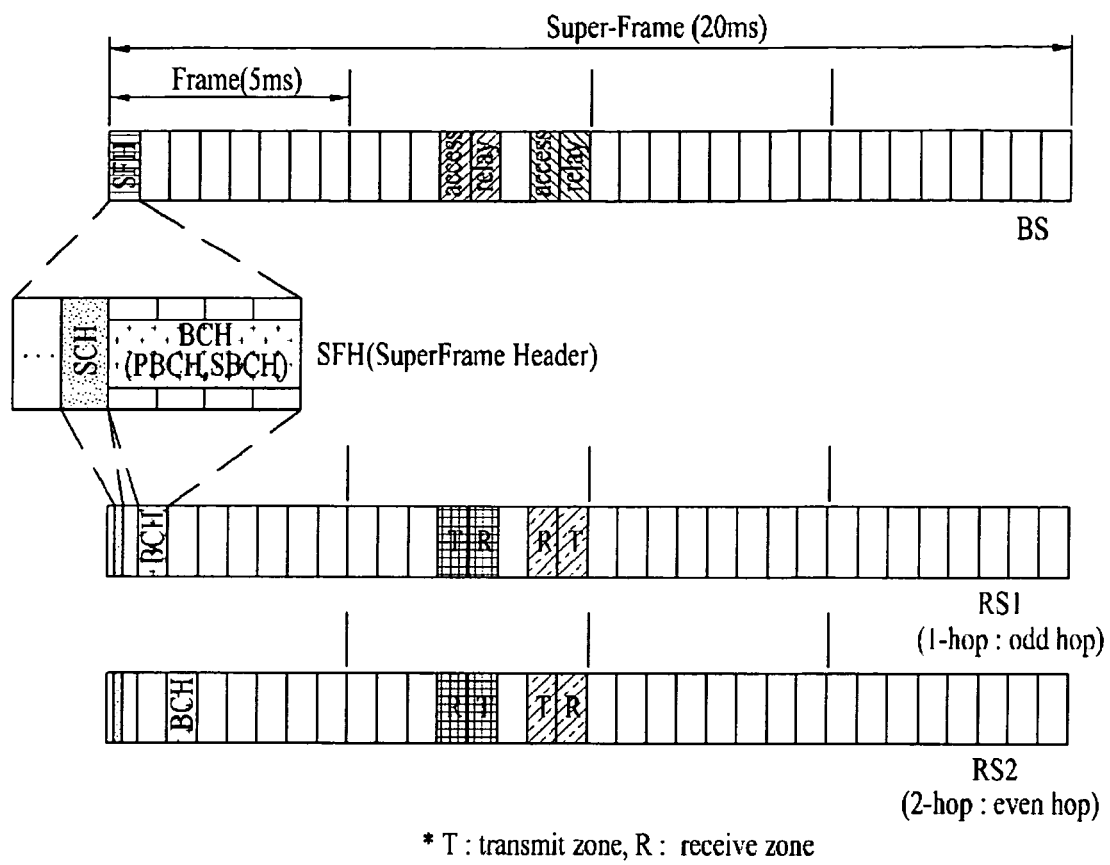

FIG. 16 and FIG. 17 respectively illustrate exemplary transmission methods of a superframe header (SFH) being transmitted from the relay station according to another embodiment of the present invention.

In FIG. 16, the SuperFrame Header (SFH) of the base station (BS) and the relay station (RS) may include the SCH and the BCH. In this case, the base station (BS), the odd-hop RS (RS 1), and the even-hop RS (RS 2) may transmit the SFH in the same subframe, regardless of the number of hops. For example, in the uni-directional transmission method, the base station and relay stations may transmit the SCH in the downlink transmit zone, and, in the bi-directional transmission method, the base station and relay stations may transmit the SCH in the bi-directional transmit zone.

In FIG. 17, the SuperFrame Header (SFH) of the base station (BS) may include the SCH and the BCH (PBCH and SBCH). At this point, interference may occur when the base station and relay station (RS) transmit the BCH at the same time. Therefore, the relay station (RS) may shift the transmission point of the BCH with the base station or another relay station in accordance with a predetermined time or number of hops.

In FIG. 16 and FIG. 17, the preamble, BCH, or SCH may include hop information. The hop information may indicate the number of hops or whether a respective corresponds to an odd hop or an even hop. Also, the SCH is used to ensure synchronization and may include a base station identifier or a relay station identifier.

As another embodiment of the present invention, the mobile station and base station (FBS and MBS) wherein the above-described embodiments of the present invention may be performed will now be described in detail.

The mobile station may operate as a transmitter in the uplink and may operate as a receiver in the downlink. Also, the base station may operate as a receiver in the uplink and may operate as a transmitter in the downlink. More specifically, the mobile station and the base station may include a transmitter and a receiver so as to transmit information or data.

The transmitter and the receiver may include a processor, a module, a part and/or means for performing the embodiments of the present invention. Particularly, the transmitter and the receiver may include a module (or means) for encoding (or encrypting) a message, a module for interpreting an encoded (or encrypted) message, an antenna for transmitting and receiving messages, and so on. An example of such transmitting end and receiving end will be described in detail with reference to FIG. 18.

Figure 18:
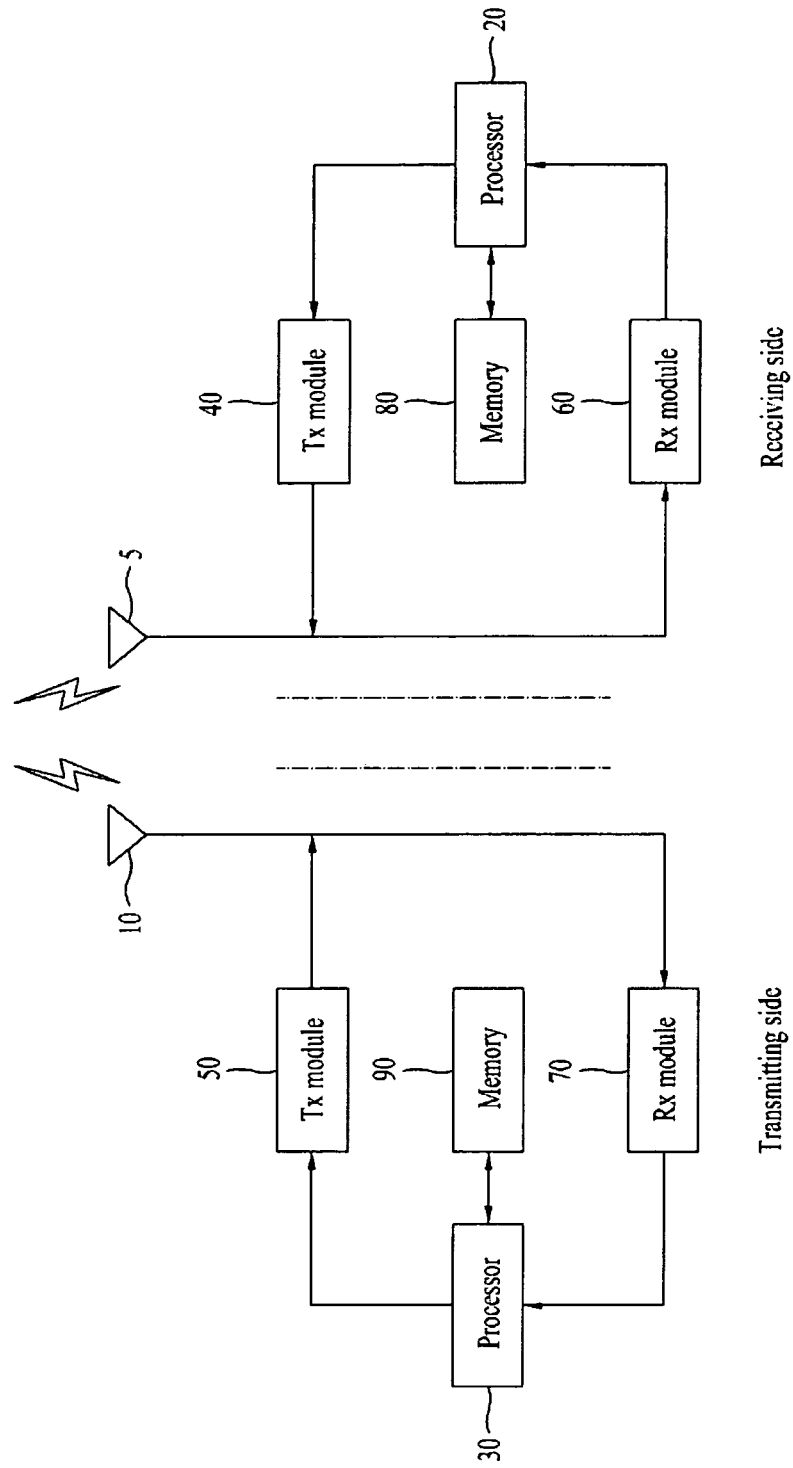
FIG. 18 illustrates a block view showing exemplary structures of a transmitting end and a receiving end according to yet another embodiment of the present invention.

FIG. 18 illustrates a block view showing exemplary structures of a transmitting end and a receiving end according to yet another embodiment of the present invention.

Referring to FIG. 18, the left side represents the structure of the transmitting end, and the right side represents the structure of the receiving end. Each of the transmitting end and the receiving end may include an antenna (5, 10), a processor (20, 30), a transmission module (Tx module) (40, 50), a receiving module (Rx module) (60, 70), and a memory (80, 90). Each element may perform its corresponding function. Hereinafter, each element will now be described in detail.

The antenna (5, 10) either transmits a signal created from the Tx module (40, 50) to the outside, or receives a wireless signal from the outside, thereby delivering the received signal to the Rx module (60, 70). When a Multiple-Input Multiple-Output (MIMO) antenna function is supported, at least 2 or more antennae may be provided herein.

The processor (20, 30) generally controls the overall operations of the transmitting end or the receiving end. Most particularly, the processor may perform a controller function for performing the above-described embodiments of the present invention, a MAC (Medium Access Control) frame variable control function based upon service characteristics and frequency environment (or condition), a hand over function, and authentication and encoding (or encryption) functions.

Particularly, the processor of the mobile terminal (or mobile station) may use the frame structure of the above-described embodiments of the present invention, so as to be in synchronization with the base station (BS) or relay station (RS), thereby performing data exchange.

For example, the processor may control the Rx module so that the Rx module at least one of the preamble, BCH, and SCH from the base station or the relay station, so as to acquire synchronization with the corresponding base station or relay station by using the information included in the received channel. Thereafter, the processor may control the Tx module so that the Tx module can transmit data in accordance with the acquire synchronization.

In another example, the processor may use hop information included in at least one of the preamble, BCH, and SCH from the uni-directional and bi-directional transmit/receive zone, so as to determine whether the respective relay station corresponds to an even hop or an odd hop. Accordingly, the processor may control the Tx module and the Rx module so that the Tx module and the Rx module can perform data exchange with the relay station through the frame structure based upon the number of hops in the corresponding relay station.

Additionally, the processor of the base station interprets the MAC message or data transmitted from the mobile station so as to allocate an uplink source required by the mobile station. Then, the processor of the base station generates an uplink grant for notifying the allocation details to the mobile station, thereby performing a scheduling process for transmitting the generated uplink grant. Thus, the processor of the base station can control transmission of the preamble for ensuring synchronization of the mobile station or odd-hop base station at a predetermined cycle period. And, the processor of the base station may also include the hop information in the preamble.

The Tx module (40, 50) may perform predetermined coding and modulation processes on the data scheduled by the processor (20, 30) and to be transmitted to the outside, thereby delivering the processed data to the antenna (10).

The Rx module (60, 70) may perform decoding and demodulation processes on a wireless signal received from the outside through the antenna (5, 10), so as to recover the processed data to the original (or initial) state, thereby delivering the recovered data to the processor (20, 30).

A program for processing and controlling the processor (20, 30) may be stored in the memory (80, 90). The memory (80, 90) may also perform functions for temporarily storing input/output data (in case of the mobile station, uplink (UL) grant allocated from the base station, system information, STID, FID, operation time, hop information, synchronization information, and so on). Furthermore, the memory (80, 90) may include at least one type of storage means, such as a flash memory type, a hard disk type, a multimedia card micro type, a card-type memory (e.g., SD or XD memory), a RAM (Random Access Memory), a SRAM (Static Random Access Memory), a ROM (Read-Only Memory), an EEPROM (Electrically Erasable Programmable Read-Only Memory), a PROM (Programmable Read-Only Memory), a magnetic memory, a magnetic disk, and an optical disk.

Meanwhile, the base station may perform a controller function for performing the above-described embodiments of the present invention, an OFDMA (Orthogonal Frequency Division Multiple Access) packet scheduling, TDD (Time Division Duplex) packet scheduling, and channel multiplexing functions, MAC frame variable control function based upon service characteristics and frequency environment (or condition), a high-speed traffic real-time control function, a hand over function, authentication and encoding (or encryption) functions, packet modulation/demodulation functions for transmitting data, a high-speed channel coding function, and a real-time modem control function through at least one of the above-described modules, or the base station may further include a separate means, module, or part for performing such functions.

It will be apparent to those skilled in the art that various modifications and variations can be made in the present invention without departing from the technical and essential spirit or scope of the invention. Therefore, the detailed description of the present invention should not be interpreted as limiting in all aspects of the present invention, but should be considered as exemplary. The scope of the appended claims of the present invention shall be decided based upon rational interpretation, and all modifications within the scope of the appended claims and their equivalents will be included in the scope of the present invention.

INDUSTRIAL APPLICABILITY

The embodiments of the present invention may be applied to various types of wireless access systems. Examples of such wireless access systems includes a 3GPP (3rd Generation Partnership Project) system, a 3GPP2 system, and/or an IEEE 802.xx (Institute of Electrical and Electronic Engineers 802) system. The embodiments of the present invention may be applied not only to the above-described various types of wireless access systems, but also to all technical field applying the above-described various types of wireless access systems.

The invention claimed is:

1. A method for transmitting a preamble in a network supporting a relay, the method comprising:

transmitting a first preamble through a downlink access zone, the first preamble being for establishing synchronization with at least one of a mobile station and relay stations divided into an odd-hop relay station and an even-hop relay station based upon a number of hops with the base station; and transmitting a second preamble through a downlink relay zone, the second preamble including supplemental information for accurately establishing synchronization with at least one of the mobile station and the relay stations, wherein the odd-hop relay station and the even-hop relay station transmit a third preamble to the mobile station or a subordinate relay station, the third preamble being used to establish synchronization with the odd-hop relay station and the even-hop relay station at a same time point where the first preamble is being transmitted.

2. The method of claim 1, wherein the second preamble is periodically transmitted with a predetermined time interval after the transmission of the first preamble.

3. The method of claim 1, wherein the first preamble and the second preamble include at least one of a synchronization channel and a broadcast channel.

4. The method of claim 1, wherein the third preamble is transmitted after a predetermined offset value from a time point where the first preamble is being transmitted.

5. A method for transmitting a preamble in a network supporting a relay, the method performed by a first relay station, the method comprising:

receiving a first preamble through a downlink access zone of a downlink, the first preamble being for establishing synchronization with the first relay station which is determined one of an odd-hop relay station and an even-hop relay station based upon a number of hops with the base station; and receiving a second preamble through a downlink relay zone, the second preamble including supplemental information for accurately establishing synchronization with the first relay station, transmitting a third preamble to the mobile station or a subordinate relay station, the third preamble being used to establish synchronization with the first relay station at a same time point where the first preamble is being transmitted, and wherein the first preamble includes hop information on the first relay station.

6. The method of claim 5, wherein the hop information indicates whether the first relay station corresponds to an odd hop or an even hop.

7. The method of claim 5, wherein the first preamble is transmitted at a same time point as a preamble being transmitted from a base station and a preamble transmitted from a second relay station, and
wherein a frame structure used in the first relay station is configured of a downlink transmit zone and a downlink receive zone.

8. The method of claim 5,
wherein the downlink is configured in an order of a downlink transmit zone, a gap, and a downlink receive zone.

9. The method of claim 5, wherein the downlink is configured in an order of the downlink access zone, a first gap, a downlink receive zone, a second gap, and the downlink transmit zone.

10. The method of claim 9, wherein the first preamble is included in a super frame header, and wherein the second preamble is transmitted with a predetermined cycle period after the transmission of the first preamble.

11. The method of claim 5, wherein the downlink is configured in an order of the downlink access zone, the downlink transmit zone, a gap, and a downlink receive zone.

12. The method of claim 5, wherein the first preamble is transmitted only to the mobile station via a downlink access zone of the downlink, and wherein the downlink is configured in an order of the downlink access zone, a gap, and a bi-directional receive zone.

13. The method of claim 5, further comprising:
transmitting a second preamble from the first relay station to the mobile station or the second relay station via a bi-directional receive zone for accurately establishing synchronization with the first relay station,
wherein the first preamble is transmitted only to the mobile station via a downlink access zone of the downlink, and
wherein the downlink is configured of the downlink access zone, a first gap, and a second gap.

14. The method of claim 5, wherein the first preamble and the second preamble are transmitted from neighboring positions.

15. The method of claim 5, wherein the first preamble and the second preamble are spaced apart at a predetermined distance and transmitted.

16. A first relay station comprising:
a receiving module;
a transmitting module;
an antenna transmitting a wireless signal received from an outside environment to the receiving module and transmitting a wireless signal delivered from the transmission module to the outside environment, and
a controller which is configured to:
receive a first preamble through a downlink access zone of a downlink, the first preamble being for establishing synchronization with the first relay station which is determined one of an odd-hop relay station and an even-hop relay station based upon a number of hops with the base station; and
receive a second preamble through a downlink relay zone, the second preamble including supplemental information for accurately establishing synchronization with the first relay station,
transmit a third preamble to the mobile station or a subordinate relay station, the third preamble being used to establish synchronization with the first relay station at a same time point where the first preamble is being transmitted.

17. The first relay station of claim 16, wherein the first preamble further includes hop information, the hop information indicating whether the first relay station corresponds to an odd hop or an even hop.

* * * * *